US012030569B2

(12) United States Patent
Solomon et al.

(10) Patent No.: US 12,030,569 B2
(45) Date of Patent: Jul. 9, 2024

(54) APPARATUS AND A METHOD FOR CONTROLLING STEERING

(71) Applicant: JAGUAR LAND ROVER LIMITED, Coventry (GB)

(72) Inventors: Nick Solomon, Coventry (GB); David Armstrong, Wythall (GB); William Ward, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/110,585

(22) Filed: Feb. 16, 2023

(65) Prior Publication Data

US 2023/0192184 A1 Jun. 22, 2023

Related U.S. Application Data

(62) Division of application No. 15/734,164, filed as application No. PCT/EP2019/064127 on May 30, 2019, now abandoned.

(30) Foreign Application Priority Data

Jun. 1, 2018 (GB) ....................... 1808998
Jun. 1, 2018 (GB) ....................... 1808999
(Continued)

(51) Int. Cl.
*B62D 6/00* (2006.01)
*B62D 7/15* (2006.01)

(52) U.S. Cl.
CPC ............. *B62D 6/007* (2013.01); *B62D 7/159* (2013.01)

(58) Field of Classification Search
CPC ..................................................... B62D 7/159
See application file for complete search history.

(56) References Cited

U.S. PATENT DOCUMENTS 4,703,822 A 11/1987 Kawamoto et al.
5,116,078 A 5/1992 Kanazawa et al.
(Continued)

FOREIGN PATENT DOCUMENTS

DE 4441924 A1 8/1995
DE 102007037765 A1 * 2/2009 ........... B62D 15/027
(Continued)

OTHER PUBLICATIONS

International Search Report corresponding to International Application No. PCT/EP2019/064127, dated Sep. 6, 2019, 4 pages.
(Continued)

*Primary Examiner* — Khoi H Tran
*Assistant Examiner* — Tristan J Greiner
(74) *Attorney, Agent, or Firm* — Reising Ethington P.C.

(57) ABSTRACT

An apparatus (104) and a method (800) for controlling steering of rear wheels (103) of a vehicle (100) are disclosed. The apparatus (104) comprises a control means (105) configured to receive a first signal indicative of a front wheel steering angle and a second signal indicative of a selected mode selected from at least a first mode and a second mode. The control means is also configured to determine a proposed rear wheel steering angle in dependence on the first signal and the second signal and to provide an output signal configured to cause steering of rear wheels (103) at the proposed rear wheel steering angle.

16 Claims, 27 Drawing Sheets

(30) Foreign Application Priority Data

| Jun. 1, 2018 | (GB) | 1809000 |
|---|---|---|
| Jun. 1, 2018 | (GB) | 1809001 |
| Jun. 7, 2018 | (GB) | 1809351 |

(56) References Cited

U.S. PATENT DOCUMENTS

| 5,566,072 A * | 10/1996 | Momose | B60T 8/174 |
| | | | 706/900 |
| 7,747,368 B2 * | 6/2010 | Tomida | B60G 17/08 |
| | | | 701/37 |
| 10,486,695 B2 | 11/2019 | Fairgrieve et al. | |
| 2003/0088350 A1 | 5/2003 | Lin | |
| 2004/0102886 A1 * | 5/2004 | Lin | B62D 6/04 |
| | | | 701/1 |
| 2006/0235590 A1 | 10/2006 | Bolourchi | |
| 2013/0321634 A1 * | 12/2013 | Okano | G06T 11/60 |
| | | | 348/148 |
| 2014/0229071 A1 | 8/2014 | Kang et al. | |
| 2014/0350789 A1 | 11/2014 | Anker | |
| 2017/0361868 A1 * | 12/2017 | Guy | B60W 40/13 |

FOREIGN PATENT DOCUMENTS

| DE | 102007037765 A1 | 2/2009 |
| EP | 1304278 A2 | 4/2003 |
| GB | 2492655 A | 1/2013 |
| GB | 2523085 A | 8/2015 |
| GB | 2527100 A | 12/2015 |
| JP | S6397472 A | 4/1988 |
| JP | H06298109 A | 10/1994 |
| JP | 2006021563 A | 1/2006 |

OTHER PUBLICATIONS

Written Opinion corresponding to International Application No. PCT/EP2019/064127, dated Sep. 6, 2019, 7 pages.
Combined Search and Examination Report corresponding to Great Britain Application No. GB1808999.5, dated Dec. 4, 2018, 8 pages.
Chinese Office Action corresponding to Chinese Application No. 201980037080-9, dated May 23, 2022, 20 pages.
Chinese Office Action corresponding to application 201980037080.9, dated Jun. 21, 2023, 22 pages.

* cited by examiner

APPARATUS AND A METHOD FOR CONTROLLING STEERING

TECHNICAL FIELD

The present disclosure relates to an apparatus and a method for controlling steering. In particular, but not exclusively it relates to an apparatus and a method for controlling steering in a road vehicle, such as a car.

Aspects of the invention relate to an apparatus, a system, a vehicle, a method, a computer program and a non-transitory computer-readable storage medium having instructions stored therein.

BACKGROUND

Some cars, that are designed to be used on roads, are arranged to have four road wheels that are all steerable. It is known, for such cars, for the rear wheels to be steered out of phase with the front wheels at low speeds, to enhance manoeuvrability, and for the rear wheels to be steered in phase with the front wheels at high speeds, to enhance stability.

A problem with such cars is that the four wheel steering arrangement, that may enhance performance on roads, is not the most appropriate for use on other terrains.

It is an aim of the present invention to address disadvantages of the prior art.

SUMMARY OF THE INVENTION

Aspects and embodiments of the invention provide an apparatus, a system, a vehicle, a method and a computer program and a non-transitory computer-readable storage medium having instructions stored therein as claimed in the appended claims.

According to an aspect of the invention there is provided an apparatus for controlling steering of rear wheels of a vehicle, the apparatus comprising a control means configured to: receive a first signal indicative of a requested steering angle; receive a second signal indicative of a selected mode selected from at least a first mode and a second mode; determine a proposed rear wheel steering angle in dependence on the first signal and the second signal; and provide an output signal configured to cause steering of rear wheels at the proposed rear wheel steering angle. This provides the advantage that the steering of the rear wheels may be optimized for the selected mode, for example to maximize manoeuvrability or stability of the vehicle, and may be optimized for the terrain on which the vehicle is travelling.

In some embodiments the control means is configured to receive a third signal indicative of the current speed of the vehicle and determine the proposed rear wheel steering angle in dependence on the third signal. This provides the advantage that the steering of the rear wheels may be optimized for the speed on which the vehicle is travelling over a terrain, for example to maximize manoeuvrability or stability of the vehicle.

In some embodiments: the proposed rear wheel steering angle is the product of a front wheel steering angle and a gain value; and the control means is configured to determine the proposed rear wheel steering angle with a gain value that depends on the selected mode indicated by the second signal.

In some embodiments the control means is configured to select the gain value in dependence on whether the current speed is below or above a threshold speed. This provides the advantage that the steering of the rear wheels may be arranged to enhance manoeuvrability below the threshold speed and/or increase stability above the threshold speed.

In some embodiments, the control means is configured to: cause steering of the rear wheels at the proposed rear wheel steering angle out of phase with the front wheel steering angle in dependence on the current speed being below the threshold speed; and cause steering of the rear wheels at the proposed rear wheel steering angle in phase with the front wheel steering angle in dependence on the current speed being above the threshold speed. This provides the advantage that the steering of the rear wheels enhances manoeuvrability below the threshold speed and increase stability above the threshold speed.

In some embodiments the control means is configured to select the threshold speed in dependence on the selected mode. This provides the advantage that the vehicle may be provided with enhanced manoeuvrability up to a relatively high threshold speed on terrains where stability is less of a concern, while providing increased stability down to a relatively low threshold speed on terrains where stability is more of an issue.

In some embodiments the control means is configured to receive the second signal from a terrain estimation system configured to produce the second signal in dependence on detected characteristics of the ground on which the vehicle is travelling. This provides the advantage that the determination of the proposed rear wheel steering angle is able to be automatically adjusted in dependence on changes of the terrain on which the vehicle travels.

In some embodiments the control means is configured to: select the first mode in dependence on a determination that friction between wheels of the vehicle and the ground in contact with the wheels is below a first friction threshold; and select the second mode in dependence on a determination that said friction is above the first friction threshold.

In some embodiments the control means is configured to: select the first mode in dependence on a determination that the ground in contact with wheels of the vehicle is deformable by the wheels of the vehicle.

In some embodiments the second signal is produced in response to an input at a user input device.

In some embodiments at least one performance characteristic of the vehicle is determined in dependence on the selected mode, the at least one performance characteristic comprising at least one of the group: throttle pedal map; transmission map; stability control settings.

In some embodiments: the control means is configured to determine a current condition of the vehicle as one of a plurality of predefined conditions and determine a proposed rear wheel steering angle that depends on the current condition; and the predefined conditions comprise at least one of: a low traction condition; oriented with a roll angle above a threshold roll angle; moving backwards down an incline. This provides the advantage that the steering of the rear wheels may be optimized for the current condition of the vehicle.

In some embodiments the control means comprises an electronic memory device having instructions stored therein; and an electronic processor electrically coupled to the electronic memory device and configured to access the electronic memory device and execute the instructions.

According to another aspect of the invention there is provided a system comprising the apparatus of any one of the previous paragraphs and at least one actuator for controlling a steering angle of the rear wheels of the vehicle in response to the output signal.

In some embodiments the system comprises a terrain estimation system configured to determine characteristics of a terrain on which the vehicle is travelling, wherein the control means is configured to select the selected mode in dependence on signals received by the control means from the terrain estimation system.

According to yet another aspect of the invention there is provided a vehicle comprising the apparatus of any one of the previous paragraphs or the system of one of the previous paragraphs.

According to a further aspect of the invention there is provided a method of controlling steering of rear wheels of a vehicle, the method comprising: receiving a first signal indicative of a requested steering angle; receiving a second signal indicative of a selected mode selected from at least a first mode and a second mode; determining a proposed rear wheel steering angle in dependence on the first signal and the second signal; and causing steering of rear wheels at the proposed rear wheel steering angle. This provides the advantage that the steering of the rear wheels may be optimized for the selected mode, for example to maximize manoeuvrability or stability of the vehicle, and may be optimized for the terrain on which the vehicle is travelling.

In some embodiments the method comprises receiving a third signal indicative of the current speed of the vehicle and determining the proposed rear wheel steering angle in dependence on the third signal. This provides the advantage that the steering of the rear wheels may be optimized for the speed on which the vehicle is travelling over a terrain, for example to maximize manoeuvrability or stability of the vehicle.

In some embodiments the proposed rear wheel steering angle is the product of the front wheel steering angle and a gain value; and the gain value depends on the selected mode indicated by the second signal.

In some embodiments the method comprises selecting the gain value in dependence on whether the current speed is below or above a threshold speed. This provides the advantage that the steering of the rear wheels may be arranged to enhance manoeuvrability below the threshold speed and/or increase stability above the threshold speed.

In some embodiments the method comprises: causing steering of the rear wheels at the proposed rear wheel steering angle out of phase with the front wheel steering angle in dependence on the current speed being below the threshold speed; and causing steering of the rear wheels at the proposed rear wheel steering angle in phase with the front wheel steering angle in dependence on the current speed being above the threshold speed. This provides the advantage that the steering of the rear wheels enhances manoeuvrability below the threshold speed and increase stability above the threshold speed.

In some embodiments the method comprises selecting the threshold speed in dependence on the selected mode. This provides the advantage that the vehicle may be provided with enhanced manoeuvrability up to a relatively high threshold speed on terrains where stability is less of a concern, while providing increased stability down to a relatively low threshold speed on terrains where stability is more of an issue.

In some embodiments the method comprises producing the second signal in dependence on detected characteristics of the ground on which the vehicle is travelling or in response to an input at a user input device.

In some embodiments the method comprises determining a current state of the vehicle as one of a plurality of predefined states and determining a proposed rear wheel steering angle that depends on the current state; and the predefined states comprise at least one of: a low traction condition; oriented with a roll angle above a threshold roll angle; moving backwards down an incline. This provides the advantage that the steering of the rear wheels may be optimized for the current condition of the vehicle.

According to another aspect of the invention there is provided a computer program which when executed by a processor causes the processor to perform the method according to any one the previous paragraphs.

According to yet another aspect of the invention there is provided a non-transitory computer-readable storage medium having instructions stored therein which when executed on a processor cause the processor to perform the method according to any one the previous paragraphs.

According to a further aspect of the invention there is provided an apparatus for controlling steering of a vehicle, the apparatus comprising a control means configured to: receive a first signal indicative of a requested steering angle; receive a second signal indicative of a selected mode; determine a proposed steering angle in dependence on the first signal and the second signal; and provide an output signal configured to cause steering of wheels at the proposed steering angle.

In some embodiments the selected mode is selected from a plurality of different terrain modes, each of which is appropriate for a corresponding type of terrain.

According to an aspect of the invention there is provided an apparatus for controlling steering of rear wheels of a vehicle, the apparatus comprising a control means configured to: determine a rearwards movement condition of a vehicle; determine a pitch angle of the vehicle; determine a proposed rear wheel steering angle in dependence on a requested steering angle, the pitch angle of the vehicle and rearwards movement condition of the vehicle; and provide an output signal configured to control rear wheel steering in dependence on the proposed rear wheel steering angle.

This provides the advantage that when the vehicle is moving backwards down a slope the rear wheels may be steered in a manner that enables the vehicle to be more easily kept on a desired path. In instances where the slope is very steep, this may allow the vehicle to be more easily kept on a path down the slope that prevents the vehicle from rolling over.

In some embodiments the control means is configured to: determine a proposed rear wheel steering angle that is out of phase with a front wheel steering angle, in dependence on the pitch angle being less than a first threshold pitch angle; and determine a proposed rear wheel steering angle that is not out of phase with the front wheel steering angle, in dependence on the pitch angle being greater than the first threshold pitch angle. This provides the advantage that the vehicle is provided with increased manoeuvrability on less steep slopes but is easier to control when reversing down steeper slopes.

In some embodiments the control means is configured to: receive a signal indicative of a selected mode selected from at least a first mode and a second mode; and when the pitch angle is greater than the first threshold pitch angle, determine a proposed rear wheel steering angle that is out of phase with the front wheel steering angle in dependence on the first mode being selected, and determine a proposed rear wheel steering angle that is not out of phase with the front wheel steering angle in dependence on the second mode being selected. This provides the advantage that when the vehicle is on a terrain such as a tarmac road, in which it is easier to control the vehicle, the vehicle may continue to be provided with increased manoeuvrability but on other terrains such as a sand dune, or grass, gravel, snow, or mud, the rear wheels may be steered to make reversing down steeper slopes easier to control.

In some embodiments the control means is configured to determine a proposed rear wheel steering angle of zero degrees in dependence on the second mode being selected.

In some embodiments the control means is configured to receive the signal indicative of a selected mode from a terrain estimation system configured to produce the signal in dependence on detected characteristics of the ground on which the vehicle is travelling. This provides the advantage that the steering of the rear wheels is automatically altered in dependence of the terrain on which the vehicle is travelling.

In some embodiments the first mode is selectable in dependence on a determination that friction between the wheels of the vehicle and the ground in contact with the wheels is above a first friction threshold and the second mode is selectable in dependence on a determination that said friction is below the first friction threshold. This provides the advantage that when the vehicle is on a terrain such as a tarmac road, which provides a high level of grip, the vehicle may continue to be provided with increased manoeuvrability, while on other terrains that provide less grip, the rear wheels may be steered in a manner to make reversing down slopes easier to control.

In some embodiments the second mode is selectable in dependence on a determination that the ground in contact with the wheels is deformable by the wheels of the vehicle. This provides the advantage that steering of the rear wheels may be optimized to make reversing down slopes formed of material such as sand easier to control.

In some embodiments the apparatus is configured to receive the signal indicative of a selected mode from a user input device.

In some embodiments at least one performance characteristic of the vehicle is determined in dependence on the selected mode, the at least one performance characteristic comprising at least one of the group consisting of: accelerator pedal map; transmission map; stability control settings.

In some embodiments the proposed rear wheel steering angle is the product of the front wheel steering angle and a gain value, and the control means is configured to: determine a first proposed rear wheel steering angle with a first gain value in dependence on the pitch angle being below the first threshold pitch angle; and determine a second proposed rear wheel steering angle with a second gain value, of smaller magnitude than the first gain value, in dependence on the pitch angle being greater than a second threshold pitch angle. The second gain value may be positive or negative, and it may also be the same as the first gain value.

In some embodiments the control means is configured to determine the proposed rear wheel steering angle to be zero in dependence on determining that the pitch angle is greater than the second threshold pitch angle.

In some embodiments, in dependence on determining a rearwards movement condition and a pitch angle greater than a third threshold pitch angle, determine a proposed rear wheel steering angle that is proportional to the steering input, and determine a proposed front wheel steering angle that is proportional to the steering input and smaller than the rear wheel steering angle.

In some embodiments, in dependence on determining a rearwards movement condition and a pitch angle greater than a third threshold pitch angle, cause locking of the front steering and determine a proposed rear wheel steering angle proportional to the steering input.

In some embodiments the control means is configured to determine the rearwards movement condition in dependence on receiving a signal indicative of rearwards movement of the vehicle and/or receiving a signal indicative of a reverse gear of the vehicle being selected. This provides the advantage that the vehicle may be made easier to steer backwards down a slope when the reversing is intentional, as indicated by the reverse gear selection, and also when the reversing is caused by a failed climb, for example up a steep slope that has a low friction and/or deformable surface.

In some embodiments the control means is configured to determine a current condition of the vehicle as one of a plurality of predefined conditions and determine a proposed rear wheel steering angle that depends on the current condition; and the predefined conditions comprise at least one of: a low traction condition; oriented with a roll angle above a threshold roll angle.

In some embodiments the control means is configured to determine that the vehicle is not in the low traction condition when the pitch angle exceeds a fourth threshold pitch angle. This provides the advantage that if the vehicle comes to a halt due to a failed climb, for example up a steep slope that has a low friction and/or deformable surface, the control means controls the steering of the rear wheels to be optimized for reversing backwards down the slope, rather than incorrectly determining that the vehicle is stuck.

In some embodiments the control means comprises an electronic memory device and having instructions stored therein; and an electronic processor electrically coupled to the electronic memory device and configured to access the electronic memory device and execute the instructions.

According to another aspect of the invention there is provided a system comprising the apparatus of any one of the previous paragraphs and at least one actuator for controlling a steering angle of the rear wheels of the vehicle in response to the output signal.

According to yet another aspect of the invention there is provided a vehicle comprising the apparatus of any one of the previous paragraphs or the system of the previous paragraph.

According to a further aspect of the invention there is provided a method for controlling steering of rear wheels of a vehicle, the method comprising: determining a rearwards movement condition of a vehicle; determining a pitch angle of the vehicle; determining a proposed rear wheel steering angle in dependence on a requested steering angle, the pitch angle of the vehicle and the rearwards movement condition of the vehicle; and controlling rear wheel steering in dependence on the proposed rear wheel steering angle.

This provides the advantage that when the vehicle is moving backwards down a slope the rear wheels are steered in a manner that enables the vehicle to be more easily kept on a desired path. In instances where the slope is very steep, this may allow the vehicle to be more easily kept on a path down the slope that prevents the vehicle from rolling over.

In some embodiments the method comprises: determining a proposed rear wheel steering angle that is out of phase with a front wheel steering angle, in dependence on the pitch angle being less than a first threshold pitch angle; and determining a proposed rear wheel steering angle that is not out of phase with the front wheel steering angle, in dependence on the pitch angle being greater than the first threshold pitch angle. This provides the advantage that the vehicle is more easily manoeuvred on less steep slopes but is easier to control when reversing down steeper slopes.

In some embodiments the method comprises: receiving a signal indicative of a selected mode selected from at least a first mode and a second mode; and when the pitch angle is greater than the first threshold pitch angle, determining a proposed rear wheel steering angle that is not out of phase with the front wheel steering angle in dependence on the second mode being selected, and determining a proposed rear wheel steering angle that is out of phase with the front wheel steering angle in dependence on the first mode being selected. This provides the advantage that when the vehicle is on a terrain such as a tarmac road, in which it is easier to control the vehicle, the vehicle may continue to be provided with increased manoeuvrability but on other terrains such as a sand dune, or grass, gravel, snow, or mud, the rear wheels may be steered to make reversing down steeper slopes easier to control In some embodiments the method comprises receiving the signal indicative of a selected mode from a terrain estimation system configured to produce the signal in dependence on detected characteristics of the ground on which the vehicle is travelling. This provides the advantage that the steering of the rear wheels is automatically altered in dependence of the terrain on which the vehicle is travelling.

In some embodiments the first mode is selected in dependence on a determination that friction between the wheels of the vehicle and the ground in contact with the wheels is above a first friction threshold and the second mode is selected in dependence on a determination that said friction is below the first friction threshold. This provides the advantage that when the vehicle is on a terrain such as a tarmac road, which provides a high level of grip, the vehicle may continue to be provided with increased manoeuvrability, while on other terrains that provide less grip, the rear wheels may be steered in a manner to make reversing down slopes easier to control.

In some embodiments the second mode is selected in dependence on a determination that the ground in contact with the wheels is deformable by the wheels of the vehicle. This provides the advantage that steering of the rear wheels may be optimized to make reversing down slopes formed of material such as sand easier to control.

In some embodiments the signal indicative of a selected mode is produced in dependence on a user input at a user input device.

In some embodiments the proposed rear wheel steering angle is the product of the front wheel steering angle and a gain value, and the method comprises: determining a first proposed rear wheel steering angle with a first gain value in dependence on the pitch angle being below a threshold pitch angle; and determining a second proposed rear wheel steering angle with a second gain value, smaller than the first gain value, in dependence on the pitch angle being greater than a second threshold pitch angle.

In some embodiments the method comprises determining the proposed rear wheel steering angle to be zero in dependence on determining that the pitch angle is greater than the second threshold pitch angle.

In some embodiments the method comprises determining a current state of the vehicle as one of a plurality of predefined conditions, and determining a proposed rear wheel steering angle that depends on the current condition; and the predefined conditions comprise at least one of: a low traction condition; oriented with a roll angle above a threshold roll angle.

According to a further aspect of the invention there is provided a computer program which when executed by a processor causes the processor to perform the method according to any one of the previous paragraphs.

According to yet a further aspect of the invention there is provided a non-transitory computer-readable storage medium having instructions stored therein which when executed on a processor cause the processor to perform the method according to any one of the previous paragraphs.

According to yet another aspect of the invention there is provided an apparatus for controlling steering of rear wheels of a vehicle, the apparatus comprising a control means configured to: determine a condition of a vehicle in dependence on a plurality of state values defining a current state of the vehicle; determine a proposed rear wheel steering angle in dependence on a requested steering angle and the condition of the vehicle; and cause steering of the rear wheels of the vehicle in dependence on the proposed rear wheel steering angle.

In some embodiments the state values consist of at least two of the group comprising a roll angle, a pitch angle, a longitudinal velocity, a longitudinal acceleration, a centripetal acceleration, a yaw rate target, a yaw rate measurement, the requested steering angle and a vehicle direction indication.

In some embodiments the control means is configured to determine the condition of the vehicle as one of a plurality of predefined conditions. In some embodiments, the predefined conditions comprise a standard condition and at least one of the group consisting of: a reverse down condition, in which the vehicle is moving backwards down an incline; a bank condition, in which the vehicle is oriented with a roll angle above a threshold roll angle; and low traction condition.

According to an aspect of the invention there is provided an apparatus for controlling steering of rear wheels of a vehicle, the apparatus comprising a control means configured to: determine from received signals whether the vehicle is in a low traction condition; receive a first signal indicative of a front wheel steering angle; determine a proposed rear wheel steering angle in dependence on the first signal and whether the vehicle is determined to be in a low traction condition; and provide an output signal configured to cause steering of the rear wheels at the proposed rear wheel steering angle. This provides the advantage that, if the vehicle is stuck or only making slow progress due to poor traction provided by the terrain on which the vehicle is driving, cyclical steering of the front wheels that is designed to create additional grip may be emulated by the steering of the rear wheels. For example, a driver may oscillate the steering wheel left and right while requesting torque from the powertrain to scrub away a loose surface layer under the front wheels to gain better traction on a harder surface below. This action may be emulated by the rear wheels to additionally provide better traction between the rear wheels and the ground.

In some embodiments the proposed rear wheel steering angle is the product of the front wheel steering angle and a gain value; the control means is configured to select a first gain value in dependence on the vehicle being in a low traction condition and to select a second gain value in dependence on the vehicle not being in a low traction condition; and the first gain value is greater than the second gain value. This provides the advantage that the rear wheels may be made to oscillate at angles that are more like those of the front wheels when attempting to increase traction.

In some embodiments the control means is configured to determine that the vehicle is in a low traction condition in dependence on a set of criteria being met. This provides the advantage that the vehicle is able to automatically determine a proposed rear wheel steering angle appropriate for a low traction condition. For example, it does not require a user to provide an input at a user input device in order for the rear wheels to be steered with a larger second gain value that is suitable for increasing traction.

In some embodiments one of the criteria comprises a determination that the front wheel steering angle is oscillating with a frequency above a threshold frequency.

In some embodiments one of the criteria comprises an indication of torque being requested from a powertrain.

In some embodiments the control means is configured to receive a signal indicative of a measured yaw rate of the vehicle, and to calculate a target yaw rate in dependence on the front wheel steering angle, the rear wheel steering angle and an indication of speed of the wheels; and one of the criteria comprises a difference between the measured yaw of the vehicle and the target yaw being greater than a threshold value. This provides the advantage that the control means is able to accurately determine whether the vehicle is in a low traction condition.

In some embodiments the control means is configured to receive an indication of a selected mode, and, when the vehicle is determined to be in a low traction condition, the control means is configured to determine the proposed steering angles for the rear wheels in dependence on the selected mode. This provides the advantage that, for example, rear wheel steering that would be helpful in freeing a vehicle when stuck in sand or mud, does not have to be used when it is not appropriate in a currently selected mode, such as a mode used on rough rocky terrain.

In some embodiments the selected mode is selected in response to a user input or in response to terrain sensor signals.

In some embodiments, when the vehicle is determined to be in a low traction condition, the control means is arranged to provide an output signal that is configured to cause steering of the rear wheels out of phase with steering of the front wheels. This provides the advantage that when the traction of the vehicle is improved, additional steering in the rear wheels that is used to obtain increased traction, only causes the vehicle to turn more rapidly, whereas if the rear wheels were steered in phase with the front wheels, when the traction of the vehicle improves, the vehicle might suddenly move to one side in the direction of steer.

In some embodiments the control means is configured to determine a current state of the vehicle as one of a plurality of predefined states and determine a proposed rear wheel steering angle that depends on the current state; and the predefined states comprise at least one of: oriented with a roll angle above a threshold roll angle; moving backwards down an incline with a pitch angle above a threshold pitch angle. This provides the advantage that the steering of the rear wheels may be optimized for the current condition of the vehicle.

In some embodiments the control means comprises an electronic memory device and having instructions stored therein; and an electronic processor electrically coupled to the electronic memory device and configured to access the electronic memory device and execute the instruction According to another aspect of the invention there is provided a system for controlling steering of rear wheels of a vehicle, the system comprising the apparatus of any one of the previous paragraphs and at least one actuator for controlling a steering angle of the rear wheels of the vehicle in response to the output signal.

In some embodiments the system comprises sensing means configured to sense yaw rate of the vehicle.

In some embodiments the sensing means comprises a gyroscope.

According to a further aspect of the invention there is provided a vehicle comprising the apparatus of any one of the previous paragraphs or the system of any one of the previous paragraphs In some embodiments the vehicle comprises a steering mechanism for controlling the steering angle of the front wheels of the vehicle comprising a manually operable device configured to enable adjustment of the steering mechanism.

According to another aspect of the invention there is provided a method of controlling steering of rear wheels of a vehicle with front wheel steer and rear wheel steer, the method comprising: determining from received signals whether the vehicle is in a low traction condition; receiving a first signal indicative of a front wheel steering angle; determining a proposed rear wheel steering angle in dependence on the first signal and whether the vehicle is determined to be in a low traction condition; and causing steering of the rear wheels at the proposed rear wheel steering angle. This provides the advantage that, if the vehicle is stuck or only making slow progress due to poor traction provided by the terrain on which the vehicle is driving, cyclical steering of the front wheels that is designed to create additional grip may be emulated by the steering of the rear wheels.

In some embodiments the proposed rear wheel steering angle is the product of the front wheel steering angle and a gain value; a first gain value is selected in dependence on a determination of the vehicle being in a low traction condition; a second gain value is selected in dependence on a determination of the vehicle not being in a low traction condition; and the first gain value is greater than the second gain value. This provides the advantage that the rear wheels are made to oscillate at angles that are more like those of the front wheels when attempting to increase traction In some embodiments the vehicle is determined to be in a low traction condition in dependence on a set of criteria being met. This provides the advantage that a proposed rear wheel steering angle appropriate for a low traction condition is automatically determined.

In some embodiments one of the criteria comprises a determination that the front wheel steering angle is oscillating with a frequency above a threshold frequency.

In some embodiments one of the criteria comprises an indication of torque being requested.

In some embodiments the method comprises receiving a signal indicative of a measured yaw rate of the vehicle, and calculating a target yaw rate in dependence on the front wheel steering angle, the rear wheel steering angle and a received indication of a speed of the wheels; and one of the criteria comprises a difference between the measured yaw of the vehicle and the target yaw being greater than a threshold value. This provides the advantage that the control means is able to accurately determine whether the vehicle is in a low traction condition.

In some embodiments the method comprises receiving an indication of a selected mode, and, determining the proposed steering angles for the rear wheels in dependence on the selected mode. This provides the advantage that, for example, rear wheel steering that is helpful in freeing a vehicle when stuck in sand or mud, may not be used when it is not appropriate in a currently selected mode, such as a mode used on rough rocky terrain.

In some embodiments the selected mode is selected in response to a user input or in response to terrain sensor signals.

In some embodiments, when the vehicle is determined to be in a low traction condition, the method comprises causing steering of the rear wheels out of phase with steering of the front wheels. This provides the advantage that when the traction of the vehicle is improved, additional steering in the rear wheels that is used to obtain increased traction, only causes the vehicle to turn more rapidly, whereas if the rear wheels were steered in phase with the front wheels, when the traction of the vehicle improves, the vehicle might suddenly move to one side in the direction of steer.

According to yet another aspect of the invention there is provided a computer program which when executed by a processor causes the processor to perform the method according to any one of the previous paragraphs.

According to yet a further aspect of the invention there is provided a non-transitory computer-readable storage medium having instructions stored therein which when executed on a processor cause the processor to perform the method according to any one of the previous paragraphs.

According to an aspect of the invention there is provided an apparatus for controlling steering of a vehicle, the apparatus comprising a control means configured to: receive a first signal indicative of a requested steering angle; receive a second signal indicative of a roll angle of the vehicle; determine a proposed steering angle for steerable wheels of the vehicle in dependence on the first signal; and provide an output signal configured to cause steering of the steerable wheels at the proposed steering angle; wherein, in dependence on a set of criteria being met, the control means is configured to determine the proposed steering angle in dependence on the second signal. This provides the advantage that it is easier for a driver to maintain a desired path along a bank, for example at a constant height up the bank.

In some embodiments the control means is configured to increase proposed steering angles in dependence on receiving second signals indicative of increasing roll angles. This provides the advantage that as the steepness of the bank varies, the control means is able to automatically compensate for the varying effect of the bank on the vehicle, and so it is easier to maintain a desired path along the bank.

In some embodiments the first signal is received from a steering input sensor configured to receive user requested steering angles.

In some embodiments the apparatus is configured to control steering of rear wheels of the vehicle.

In some embodiments the first signal is indicative of a front wheel steering angle and the proposed steering angle is a proposed rear wheel steering angle.

In some embodiments, in dependence on the criteria being met, the control means is configured to determine a non-zero rear wheel steering angle in dependence on the first signal indicating a front wheel steering angle of zero. This provides the advantage that the driver is able to maintain a straight path along a bank without the steering wheel being turned.

In some embodiments the non-zero rear wheel steering angle is arranged to steer the rear of the vehicle to the right in dependence on the roll angle being positive, corresponding to the left side of the vehicle being raised relative to the right side of the vehicle, and the non-zero rear wheel steering angle is arranged to steer the rear of the vehicle to the left in dependence on the roll angle being negative. This provides the advantage that the rear wheels steer the rear of the vehicle down the bank so that the vehicle is angled slightly up the bank and cause the vehicle to progress on a path along the bank.

In some embodiments, in dependence on the criteria being met, the control means is configured to decrease proposed steering angles for the rear steerable wheels in dependence on receiving first signals indicating increasing front wheel steering angles that are below a threshold angle. This provides the advantage that the rear wheel steering is able to smoothly transition into a standard mode to allow a driver to smoothly alter the course of the vehicle, for example, off the bank.

In some embodiments, in dependence on the criteria being met, the control means is configured to increase proposed steering angles for the rear steerable wheels in dependence on receiving first signals indicating increasing front wheel steering angles that are above the threshold angle. This provides the advantage that the control of the steering transitions to a more agile mode when steering angles are above the threshold angle In some embodiments, in dependence on one of the set of criteria not being met, the control means is configured to determine a zero rear wheel steering angle when the first signal indicates a front wheel steering angle of zero. This provides the advantage that unless all of the set of criteria are met, which indicates that the vehicle is traversing a bank, the rear wheel steering is able to operate in a conventional manner.

In some embodiments, in dependence on one of the set of criteria not being met, the control means is configured to increase proposed steering angles for the rear steerable wheels when received first signals indicate increasing front wheel steering angles that are above or below the threshold angle.

In some embodiments the control means is configured to receive a mode signal, and, when the criteria are met, the control means is configured to determine the proposed steering angles for the rear steerable wheels in dependence on the mode signal. This provides the advantage that the rear wheel steering may be controlled in a manner that is expected to most appropriately compensate for the effect of the bank on the vehicle. For example, when the vehicle is driven along a bank and the front wheels are steered at zero degrees, the rear wheels may be steered at a relatively large angle in a mode used for driving on sand and a relatively small angle, or zero degrees, in a mode used for driving on hard ground.

In some embodiments the mode signal is generated in response to a user input or generated in response to terrain sensor signals.

In some embodiments the control means is configured to determine a proposed steering angle for the rear steerable wheels that are the product of the front wheel steering angle and a gain value; the gain value depends on whether all of the criteria are met; and the control means is configured to cause a gradual transition between a first gain value and a second gain value in dependence on a change from one criteria not being met to all criteria being met. This provides the advantage that the steering automatically adjusts as the vehicle travels onto a bank in a smooth manner so that the user is easily able to maintain control of the vehicle's direction.

In some embodiments the set of criteria comprises the second signal being indicative of a roll angle that is larger than a threshold angle.

In some embodiments the set of criteria comprises the roll angle having been continuously above the threshold angle for a defined period of time. This provides the advantage that the steering does rapidly fluctuate if the vehicle travels along a bank at angles that oscillate from above to below the threshold angle.

In some embodiments the control means is configured to: receive a speed signal indicative of current speed of the vehicle; and the set of criteria comprises the speed signal being indicative of a current speed below a threshold speed.

In some embodiments: the control means is configured to determine a current condition of the vehicle as one of a plurality of predefined conditions and determine a proposed rear wheel steering angle that depends on the current condition; and the predefined conditions comprise at least one of: a low traction condition; moving backwards down an incline with a pitch angle above a threshold pitch angle. This provides the advantage that the steering of the rear wheels may be optimized for the current condition of the vehicle.

In some embodiments the control means comprises an electronic memory device and having instructions stored therein; and an electronic processor electrically coupled to the electronic memory device and configured to access the electronic memory device and execute the instructions According to another aspect of the invention there is provided a system for controlling steering of a vehicle, the system comprising the apparatus of any one of the previous paragraphs and at least one actuator for controlling a steering angle of wheels of the vehicle in response to the output signal According to yet another aspect of the invention there is provided a vehicle comprising the apparatus of any one of the previous paragraphs or the system of the previous paragraph.

According to a further aspect of the invention there is provided a method of controlling steering of a vehicle, the method comprising: determining a proposed steering angle for steerable wheels of the vehicle in dependence a requested steering angle; and providing an output signal configured to cause steering of the steerable wheels at the proposed steering angle; wherein, in dependence on a set of criteria being met, the proposed steering angle is determined in dependence on a roll angle of the vehicle. This provides the advantage that it is easier for a driver to maintain a desired path along a bank, for example at a constant height up the bank.

In some embodiments the method comprises increasing proposed steering angles in dependence on receiving second signals indicative of increasing roll angles. This provides the advantage that as the steepness of the bank varies, the varying effect of the bank on the vehicle is compensated for, and so it is easier to maintain a desired path along the bank.

In some embodiments the output signal is configured to control steering of rear wheels of the vehicle.

In some embodiments the first signal is indicative of a front wheel steering angle and the proposed steering angle is a proposed rear wheel steering angle.

In some embodiments, in dependence on the criteria being met, the method comprises determining a non-zero rear wheel steering angle in dependence on the first signal indicating a front wheel steering angle of zero, and decreasing proposed steering angles for the rear steerable wheels in dependence on receiving first signals indicating increasing front wheel steering angles that are below a threshold angle. This provides the advantage that the driver is able to maintain a straight path along a bank without the steering wheel being turned, and to smoothly transition into a standard mode to allow a driver to smoothly alter the course of the vehicle, for example, off the bank.

In some embodiments one of the set of criteria is that the second signal is indicative of a roll angle that is larger than a threshold angle.

In some embodiments one of the set of criteria is that the roll angle has been continuously above the threshold angle for a defined period of time. This provides the advantage that the steering does rapidly fluctuate if the vehicle travels along a bank at angles that oscillate from above to below the threshold angle.

In some embodiments one of the set of criteria is that the current speed is below a threshold speed.

According to a further aspect of the invention there is provided a computer program which when executed by a processor causes the processor to perform the method according to any one of the previous paragraphs.

According to yet another aspect of the invention there is provided a non-transitory computer-readable storage medium having instructions stored therein which when executed on a processor cause the processor to perform the method according to any one of the previous paragraphs.

According to an aspect of the present invention there is provided a control system for a steering system of a vehicle, the control system comprising one or more controllers, the control system configured to compare a deceleration time value to a target time value, wherein the deceleration time value is indicative of a predicted duration until the vehicle's speed reaches zero, and output a control signal to control a steering angle of a steered wheel in dependence on the comparison, such that the steered wheel is controlled to turn towards a straight ahead condition by the time the vehicle speed reaches zero.

This provides the benefit that the wheels are not subjected to 'dry steering' and the further benefit that the steering angle is not unduly limited such that manoeuvrability is improved. This is particularly advantageous in control systems in which the steering system is a rear wheel steering system, as the components and actuators may be of smaller mechanical and electrical capacities than in a front wheel steering system.

In some embodiments the control system is configured to output the control signal in dependence on the deceleration time value being equal to or less than the target time value, or in other words, in dependence on the target time value being equal to or greater than the deceleration time value In an embodiment of the invention the target time value may be a predetermined time value stored within a memory of the one or more controllers.

In an alternative embodiment to the preceding embodiment the target time value comprises an actuator time value, the actuator time value being indicative of a duration for a steered wheel of the vehicle to return to the straight ahead condition. Preferably the actuator time value is determined in dependence on a current actuator displacement and an actuator rate.

The actuator rate may be a predetermined value stored in a memory of the one or more controllers, alternatively the actuator rate may be determined in dependence on at least one of a surface friction value and a vehicle mass value.

The target time value may further comprise a tuneable time value, preferably determined at least in part in dependence on an estimated latency within the control system.

The tuneable time value may be further determined dynamically at least in part in dependence on at least one of: a current vehicle speed, a current vehicle acceleration, surface friction value and a vehicle mass value.

The tuneable time value may be a predetermined time value stored within a memory of the one or more controllers.

In some embodiments of the invention the straight ahead condition may be within the range of −3.5 to 3.5 degrees from parallel to a longitudinal axis of the vehicle.

In an embodiment of the invention the control system may be configured to receive a speed signal indicative of a current vehicle speed, an acceleration signal of a current vehicle acceleration, and determine the deceleration time value in dependence on the received speed signal and acceleration signal.

Alternatively the control system may be configured to receive a plurality of speed signals indicative of vehicle speeds over a time period, and determine the deceleration time value in dependence on the received plurality of speed signals In some embodiments the control signal overrides a normal use control signal.

In some embodiments the control system is configured to receive a drive mode signal indicative of a drive mode of a vehicle, not output the control signal in dependence on the drive mode signal. The driving mode may be a rock crawl mode.

According to an aspect of the present invention there is provided a steering system comprising the control system of the preceding aspect In some embodiments the steering system comprises a steering actuator.

According to an aspect of the present invention there is provided a vehicle comprising the control system or the steering system of the preceding aspects. Preferably the vehicle is a rear wheel steer or all wheel steer vehicle.

According to an aspect of the present invention there is provided a method of controlling a steering system of a vehicle, the method comprising: comparing a deceleration time value to a target time value, wherein the deceleration time value is indicative of a predicted duration until the vehicle's speed reaches zero, and controlling a steering angle of the steered wheel in dependence on the comparison, such that the steered wheel is returned to the straight ahead condition by the time the vehicle speed reaches zero.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
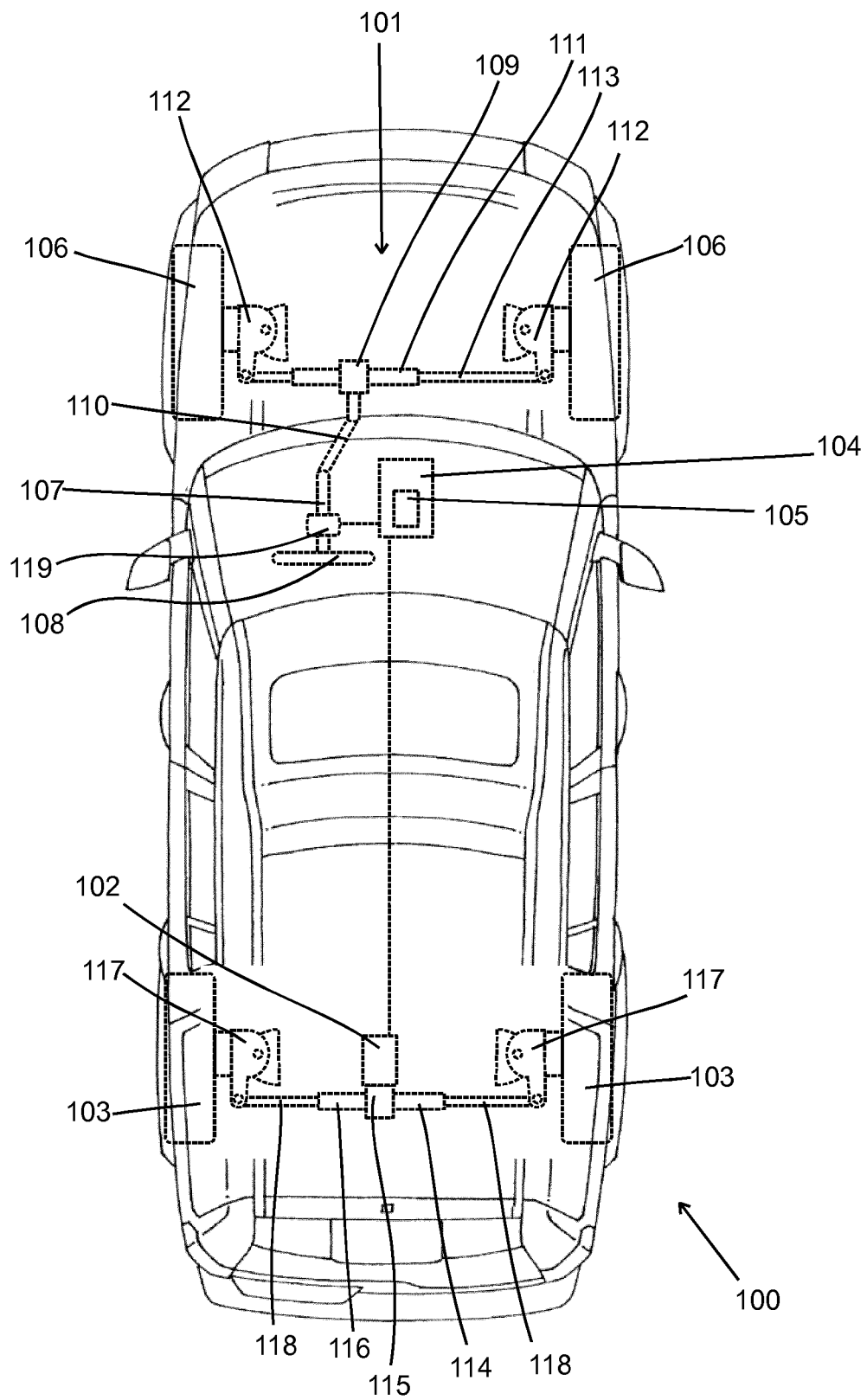
FIG. 1 shows a top view of a vehicle embodying the present invention.

A vehicle 100 embodying the present invention is shown in a top view in FIG. 1. The vehicle 100 is a car that is configured for use both on roads and off-road on various types of terrain. In the present embodiment, the vehicle 100 is a four wheel drive vehicle, but it will be appreciated that many of the features of the vehicle 100 described below are also applicable to rear wheeled drive vehicles.

FIG. 1 also shows, somewhat schematically, a system 101 configured to enable steering of the vehicle 100. The system 101 comprises an actuator 102 configured to cause steering of rear road wheels 103 of the vehicle 100, and also includes an apparatus 104 comprising a control means 105 for controlling the operation of the actuator 102.

In the present embodiment, front road wheels 106 of the vehicle 100 are steered by means of a mechanism 107 comprising a steering wheel 108, which is connected to a pinion 109 via a steering column 110. The pinion 109 engages a rack 111 which is connected to steering knuckles 112 by tie rods 113.

The rear wheels 103 are steerable by a mechanism 114 which is operated by the actuator 102. In the present embodiment the actuator 102 is configured to drive a second pinion 115 associated with a second rack 116 which provides forces to steering knuckles 117 of the rear wheels 103 via tie rods 118.

A steering input sensor 119 is configured to sense the orientation of the steering wheel 108 and provide signals to the control means 105 indicative of the orientation of the steering wheel 108 and therefore also indicative of the orientation of the front road wheels 106. The control means 105 is configured to provide output signals to the actuator 102 to cause steering of the rear wheels 103 in dependence of the signals received from the steering input sensor 119. However, the output signals provided to the actuator 102 are also dependent on other signals received by the control means 105, as will be described in detail below.

Figure 2:
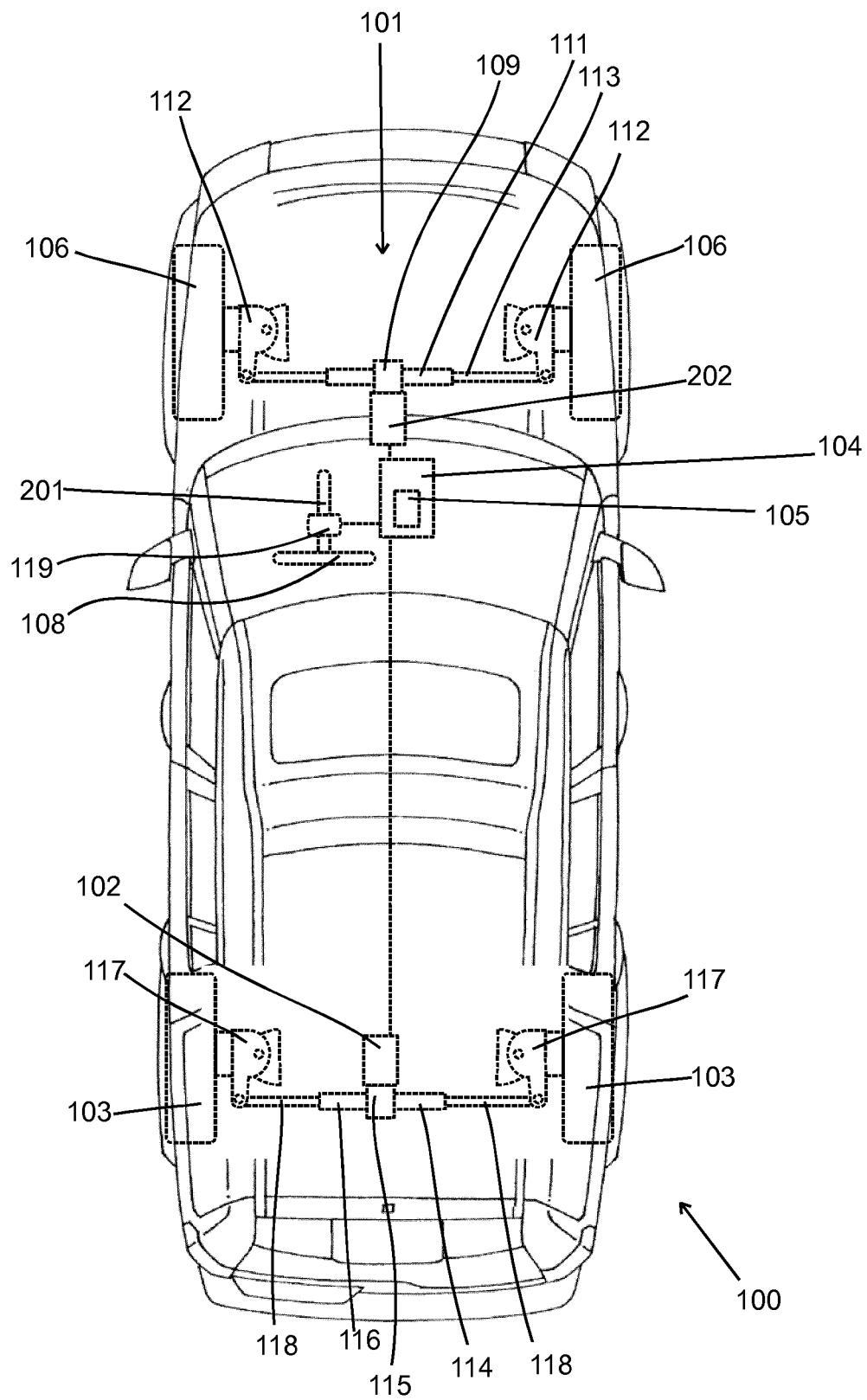
FIG. 2 shows a top view of another vehicle embodying the present invention.

An alternative vehicle 100 embodying the present invention is shown in FIG. 2, in which a system 101 enables "steer-by-wire" of all wheels 103, 106 of the vehicle 100. The vehicle 100 of FIG. 2 has many features in common with that of FIG. 1, which have been provided with the same reference signs. Thus, like the vehicle 100 of FIG. 1, the vehicle 100 of FIG. 2 comprises a system 101 comprising pinion 109 and a rack 112 configured to operate steering knuckles 112 via tie rods 113, in order to steer the front wheels 106. A first actuator 102 is configured to drive a second pinion 115 associated with a second rack 116 which provides forces to steering knuckles 117 of the rear wheels 103 via tie rods 118.

However, in the embodiment of FIG. 2, the pinion 109 for driving the front wheels 106 is driven by a second actuator 202. The steering wheel 108 is mounted on a rotatable shaft 201 but it is not mechanically connected to the pinion 109. Instead, as well as providing signals to the actuator 102 for causing steering of the rear wheels 103, the control means 105 is also configured to provide signals to the second actuator 202 to cause steering of the front wheels 106 in dependence on signals it receives from the steering input sensor 119 located on the shaft 201 of the steering wheel 108.

In an alternative embodiment, the vehicle 100 has front wheels that are steer-by-wire, like those of FIG. 2, but the rear wheels 103 are not steerable.

Figure 3:
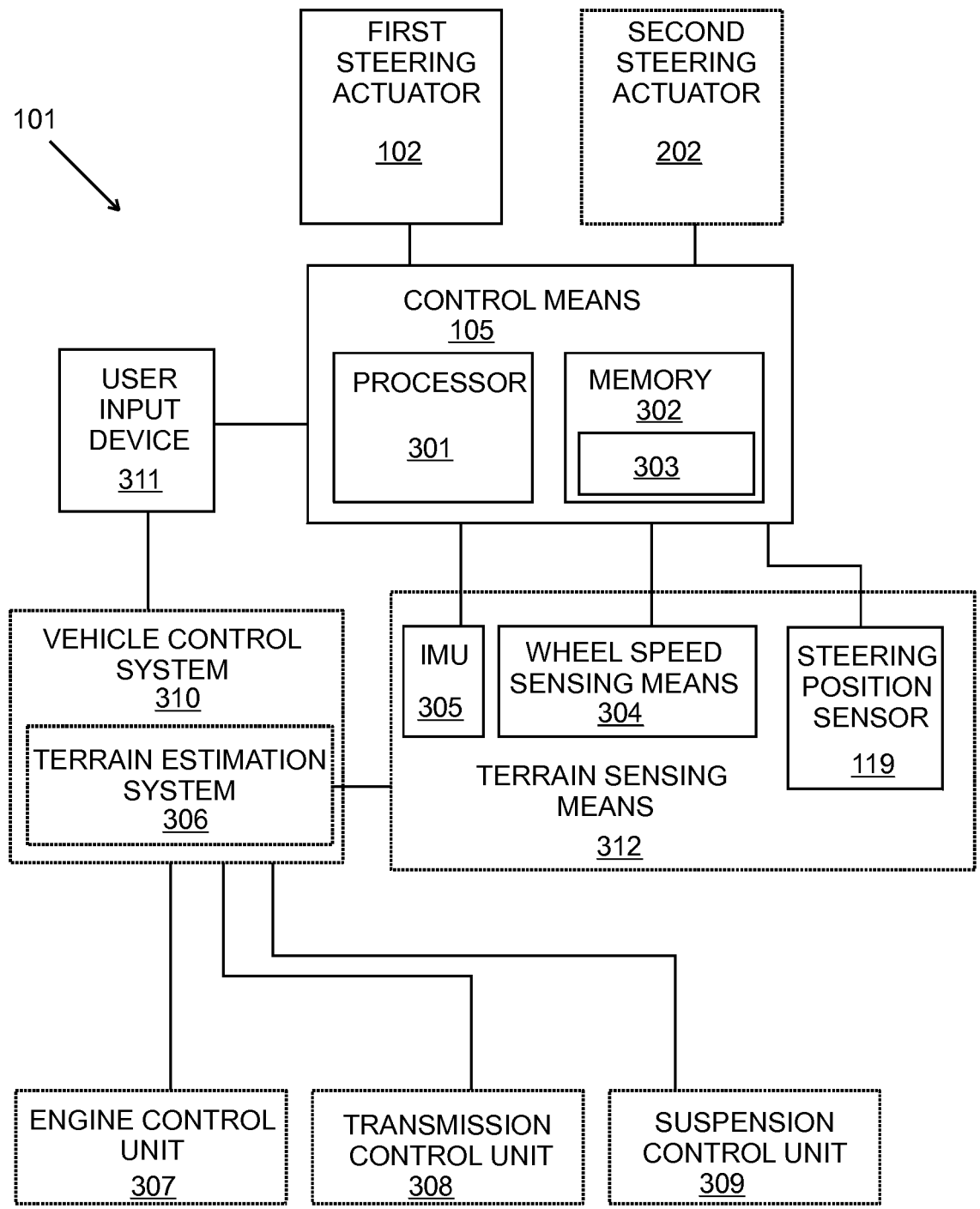
FIG. 3 shows a block diagram illustrating a system enabling steering of the vehicles of FIGS. 1 and 2.

The system 101 of FIG. 1, and that of FIG. 2, is illustrated by the block diagram shown in FIG. 3. The control means 105 comprises an electronic processor 301 and an electronic memory device 302 which stores instructions 303 performable by the processor 301 to cause the processor 301 to perform the method described below and output signals to the first steering actuator 102 to cause steering of the rear wheels 103. In the case of the vehicle 100 of FIG. 2, the processor 301 also provides signals to the second steering actuator 202 for steering the front wheels 106. Although only one processor and memory device are illustrated in FIG. 3, it will be understood that the control means 105 may comprise several processors 301 and/or several electronic memory devices 302, so that the processing as described below may be distributed over several processors.

As well as receiving signals from the steering input sensor 119, the control means 105 receives signals from wheel speed sensing means 304 indicative of a speed of rotation of each road wheel 103, 106. The wheel speed sensing means 304 may comprise wheel speed sensors, each of which is arranged to measure a speed of rotation of a respective one of the wheels 103, 106 and to provide a value for the speed of rotation directly to the control means 105. Alternatively, the wheel speed sensors may form a part of another system such as an antilock braking system (not shown) comprising a control unit configured to receive the signals from the wheel speed sensors and provide wheel speed values to the control means 105.

The control means 105 also receives signals from an inertial measurement unit (IMU) 305, which in the present embodiment comprises a six degrees of freedom IMU. The IMU 305 comprises accelerometers configured to measure longitudinal acceleration ($a_x$), lateral acceleration ($a_y$) and vertical acceleration ($a_z$) of the vehicle 100, and gyroscopes configured to measure a rate of roll ($\omega_x$), a rate of pitch ($\omega_y$) and a rate of yaw ($\omega_z$) of the vehicle 100. The IMU 305 is configured to provide indications of the measured accelerations ($a_x$, $a_y$, $a_z$) and angular velocities ($\omega_x$, $\omega_y$, $\omega_z$) to the control means 105.

In the present embodiment, the vehicle 100 comprises several electronic control units for controlling subsystems of the vehicle 100. For example, the vehicle 100 comprises: an engine control unit (ECU) 307 for controlling operation of an engine (not shown) of the vehicle 100; a transmission control unit (TCU) 308 for controlling gear selection; and a suspension control unit (SCU) 309 for controlling properties of a suspension subsystem (not shown). Each of the subsystems is capable of working in several different modes, and the vehicle 100 comprises a vehicle control system 310 configured to control the mode in which the subsystems operate. For example, the engine control unit 307 may be controlled by the vehicle control system 310 to operate using an accelerator pedal map selected from several different maps; the transmission control unit 308 may be controlled to operate using a transmission map selected from several different maps; and the suspension control unit 309 may be controlled to operate using a set of stability control settings selected from several different sets.

Depending upon a user's style of driving or a type of terrain on which the vehicle 100 is travelling, one particular accelerator pedal map may be more appropriate than others, and similarly one particular transmission map and one particular set of stability control settings may be most appropriate. To enable a user to select the most appropriate settings for a chosen style of driving or a particular terrain, the vehicle 100 also comprises a user input device (UID) 311 configured to enable a user to indicate to the vehicle control system 310 a selected driving mode. For example, the user may select a standard mode (or normal mode) when driving on tarmac roads and the vehicle control system 310 controls the ECU 307, the TCU 308 and the SCU 309 to operate in a mode suitable for the tarmac road surface. Alternatively the user may select another mode, such as a grass, gravel and snow mode for driving over a terrain that provides a low coefficient of friction, or a sand mode for driving on a deformable surface such as sand, which provides a very low coefficient of friction, or a rock crawl mode for driving on rough surfaces with high friction. In response to such a user indication, the vehicle control system 310 controls the ECU 307, the TCU 308 and the SCU 309 to operate in a mode suitable for the indicated type of terrain. The mode selected by the use of the user input device 311 is also provided to the control means 105, and may be used to determine signals provided to the first steering actuator 102 and/or the second steering actuator 202.

The user input device 311 may comprise a switch or switches, a touch screen device, or other electrical or electronic device suitable for enabling a user to provide an indication of a mode they wish to select.

The vehicle control system 310 may comprise a terrain estimation system (TES) 306. Such a system is known and described in the applicant's UK patent GB2492655B and US patent application published as US2014350789A1. The terrain estimation system 310 is configured to select a driving mode that is the most appropriate mode for the subsystems 307, 308, 309 based on measurements indicative of the terrain on which the vehicle 100 is travelling, to enable the vehicle control system 310 to automatically control the subsystems 307, 308, 309 to operate in the selected mode.

The TES 306 receives signals from terrain sensing means 312 comprising various different sensors and devices for providing information indicating the type of terrain on which the vehicle 100 is travelling. The terrain sensing means 312 may include the aforementioned IMU 305, wheel speed sensing means 304, steering input sensor 119, as well as other sensors (not shown), such as an ambient temperature sensor, an atmospheric pressure sensor, an engine torque sensor, a brake pedal position sensor, an acceleration pedal position sensor, ride height sensors, etc. Various outputs from the terrain sensing means 312 are used by the terrain estimation system 310 to derive a number of terrain indicators. For example, a vehicle speed is derived from the wheel speed sensors, wheel acceleration is derived from the wheel speed sensors, the longitudinal force on the wheels is derived from the IMU 305, and the torque at which wheel slip occurs (if wheel slip occurs) is derived from the motion sensors of the IMU 305 to detect yaw, pitch and roll. The terrain indicators are then processed to determine a probability that each of the different driving modes is appropriate, and thereby determine which of the modes is most appropriate for the operation of the subsystems. In its automatic mode, the terrain estimation system 310 continually determines for each mode the probability that it is appropriate and in dependence on another mode having a consistently higher probability than the currently selected control mode, the vehicle control system 310 commands the subsystems to operate in accordance with that other mode.

The mode determined automatically by the terrain estimation system 306, or selected by the use of the user input device 311, is also provided to the control means 105, and may be used to determine signals provided to the first steering actuator 102 and/or the second steering actuator 202.

Figure 4:
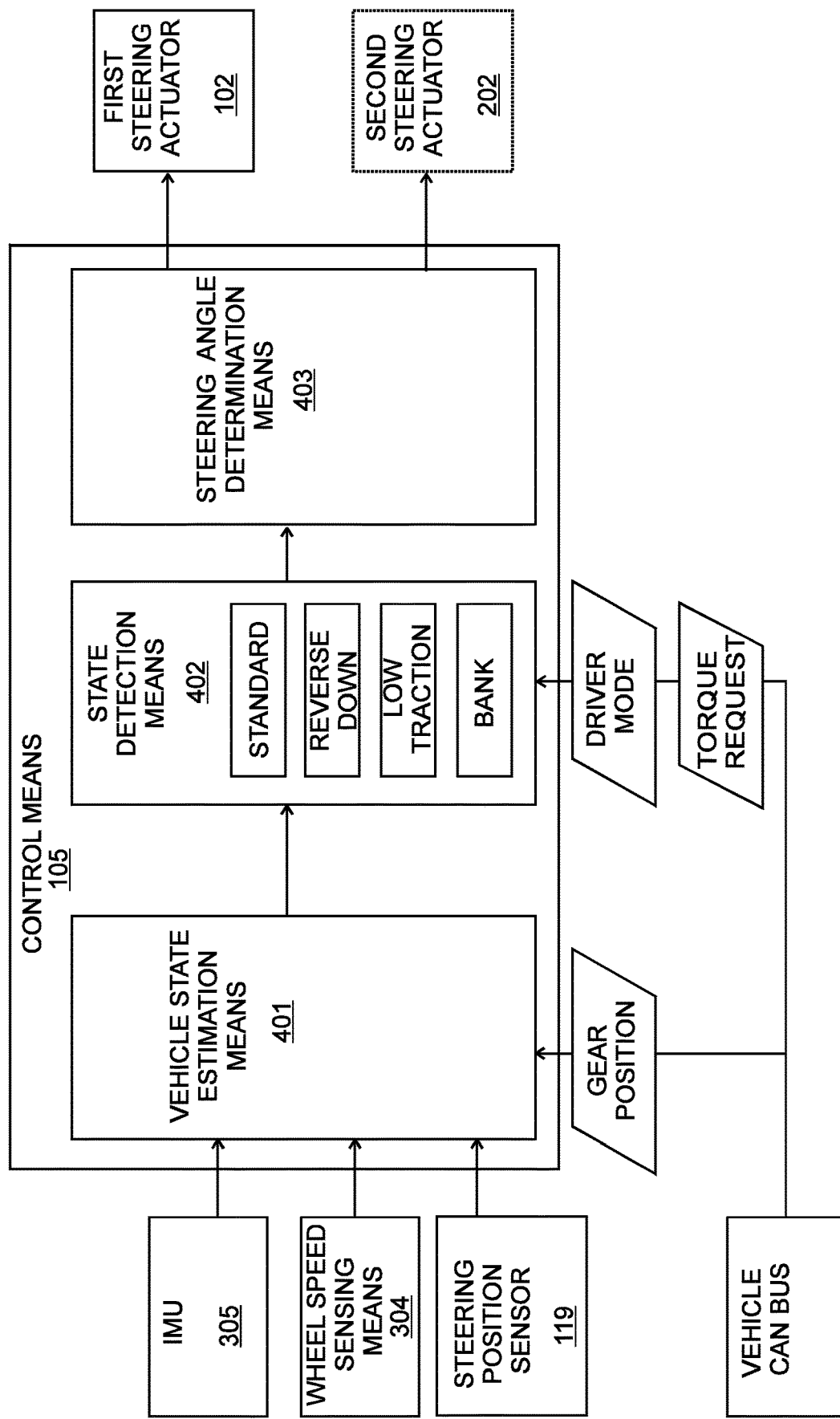
FIG. 4 shows a block diagram illustrating the functions performed by the control means illustrated in FIG. 3.

A block diagram illustrating the functions performed by the control means 105 is shown in FIG. 4. The control means 105 may comprise a vehicle state estimation means 401 which receives signals from the IMU 305 comprising measurements of at least the longitudinal acceleration ($a_x$), the lateral acceleration ($a_y$), the rate of roll ($\omega_x$), the rate of pitch ($\omega_y$) and the rate of yaw ($\omega_z$) of the vehicle 100. The vehicle state estimation means 401 also receives an indication of the currently selected gear, for example from the TCU 308 via a CAN (Controller Area Network) bus. The vehicle state estimation means 401 also receives signals from the steering input sensor 119 indicative of a requested steering angle and the wheel speed sensing means 304 comprising measurements of the angular velocity of the wheels 103, 106.

The vehicle state estimation means 401 processes the received data (i.e. the selected gear, the requested steering angle and measurements from the IMU 305 and wheel speed sensing means 304) to determine and repeatedly update a plurality of state values that provide an estimate of a current state of the vehicle 100. In the present embodiment, the vehicle state estimation means 401 comprises a Kalman filter into which the received data is input and which generates at least some of the state values. The state values comprise estimates of the roll angle ($\theta_x$), the pitch angle ($\theta_y$), the longitudinal velocity ($V_x$), longitudinal acceleration ($a_x$) and centripetal acceleration of the vehicle over the ground, as well as a yaw rate target, a yaw rate measurement, a steering angle and a vehicle direction indication, which indicates if a reverse gear is currently selected.

The yaw rate target is an estimate of the current rate of yaw of the vehicle 100 and it is calculated from the steering angle and the estimate of the longitudinal velocity ($V_x$) of the vehicle 100 over the ground using a simple mathematical model commonly referred to as a bicycle model. The yaw rate measurement is the rate of yaw measured by the IMU 305.

The control means 105 comprises a state detection means 402 which receives the state values provided by the vehicle state estimation means 401, as well as an indication of a currently selected driving mode and an indication of a powertrain torque request, such as from a throttle position sensor. The state detection means 402 is configured to analyse the state values, selected driving mode and powertrain torque request to determine whether or not the vehicle 100 is currently in a predefined special condition or alternatively in a standard condition. In the present embodiment, the vehicle state estimation means 401 is configured to determine whether the vehicle 100 is in any one of three special conditions, labelled REVERSE DOWN, LOW TRACTION and BANK in FIG. 4, or in its STANDARD condition.

An indication of whether the vehicle 100 is determined to be in one of the predefined special conditions or in the STANDARD condition is provided to a steering angle determination means 403. One or more of the state values, such as longitudinal velocity ($V_x$) or roll angle ($\theta_x$), is also received by the steering angle determination means 403 along with the requested steering angle received from the steering input sensor 119. The steering angle determination means 403 is configured to determine a proposed rear wheel steering angle in dependence on at least the requested steering angle received from the steering input sensor 119, the state of the vehicle 100 determined by the state detection means 402 and received state values. The control means 105 is configured to provide an output signal to the first steering actuator 102 to control rear wheel steering in dependence on the proposed rear wheel steering angle.

In an embodiment, such as that of FIG. 2, in which the vehicle 100 is steer-by-wire, the steering angle determination means 403 may be configured to additionally determine a proposed front wheel steering angle in dependence on at least the requested steering angle, the state of the vehicle 100 determined by the state detection means 402 and received state values. The control means 105 is then configured to provide an output signal to the second steering actuator 202 to control front wheel steering in dependence on the proposed front wheel steering angle.

Further details of how the predefined special conditions are detected and how the proposed steering angle is determined will be described below. However, the STANDARD condition, which is established when none of the defined special conditions are detected, will firstly be described with reference to FIGS. 5 to 9.

Figure 5:
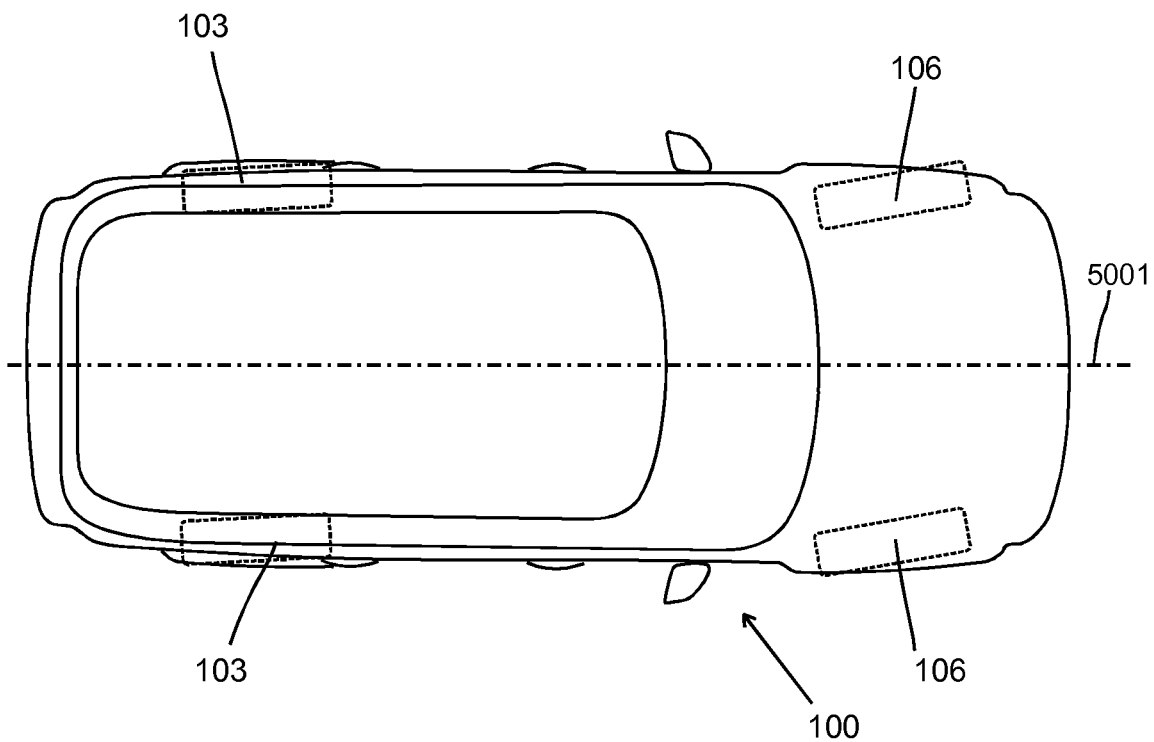
FIG. 5 shows a plan view of a vehicle travelling at a relatively high speed.
Figure 6:
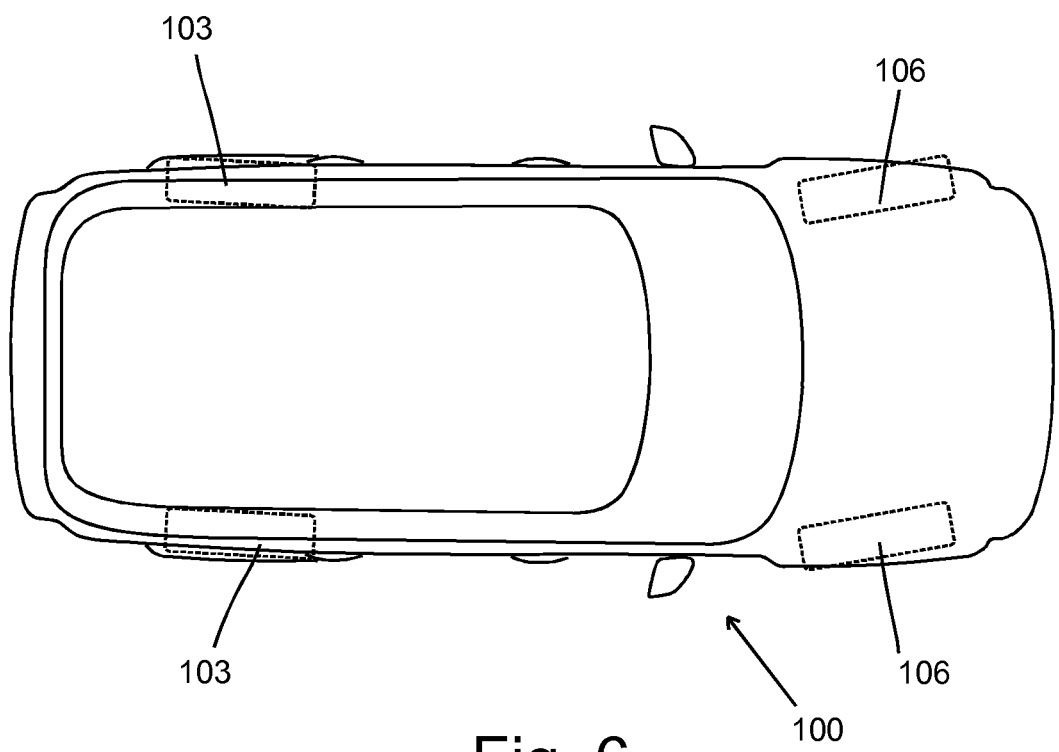
FIG. 6 shows a plan view of a vehicle travelling at a relatively low speed.

FIGS. 5 and 6 show plan views of the vehicle 100 travelling at a relatively high speed and a relatively low speed respectively. In both FIGS. 5 and 6 the front wheels 106 are turned approximately 15 degrees relative to the longitudinal axis 5001 of the vehicle 100 to cause the vehicle 100 to turn leftwards. In FIG. 5, the current speed of the vehicle 100, as determined from the wheel speed sensing means 304, is above a threshold speed and consequently the rear wheels 103 have been steered in phase with the front wheels 106. That is, because the front wheels 106 have been turned to the left, the rear wheels 103 are also turned to the left. As is known, steering the rear wheels 103 in phase with the front wheels 106 provides the vehicle 100 with increased stability, which is advantageous at high speeds.

In FIG. 5, the rear wheels 103 have only been steered leftwards by about 1.5 degrees, i.e. a tenth of the angle turned by the front wheels 106. The proportion of the front wheel steering angle by which the rear wheels 103 have been steered is referred to herein as the gain value. Thus, in this example the rear wheel steering has a gain value of +0.1 (=1.5/15).

In FIG. 6 the current speed of the vehicle 100 is below the threshold speed and consequently the rear wheels 103 have been steered out of phase with the front wheels 106. That is, because the front wheels 106 have been turned to the left, the rear wheels 103 have been turned to the right. Stability of the vehicle 100 is not an issue at low speeds and, as is known, steering the rear wheels 103 out of phase with the front wheels 106 provides the vehicle 100 with increased agility The rear wheels 103 have been steered rightwards by about 3 degrees, i.e. a fifth of the angle turned by the front wheels 106. Thus, in this example the rear wheel steering has a gain value of −0.2 (=−3/15). I.e. the absolute value (0.2) of the gain value is higher than the gain value for speeds above the threshold speed, but the gain value is negative due to the rear wheels 103 being turned out of phase with the front wheels 106.

Figure 7:
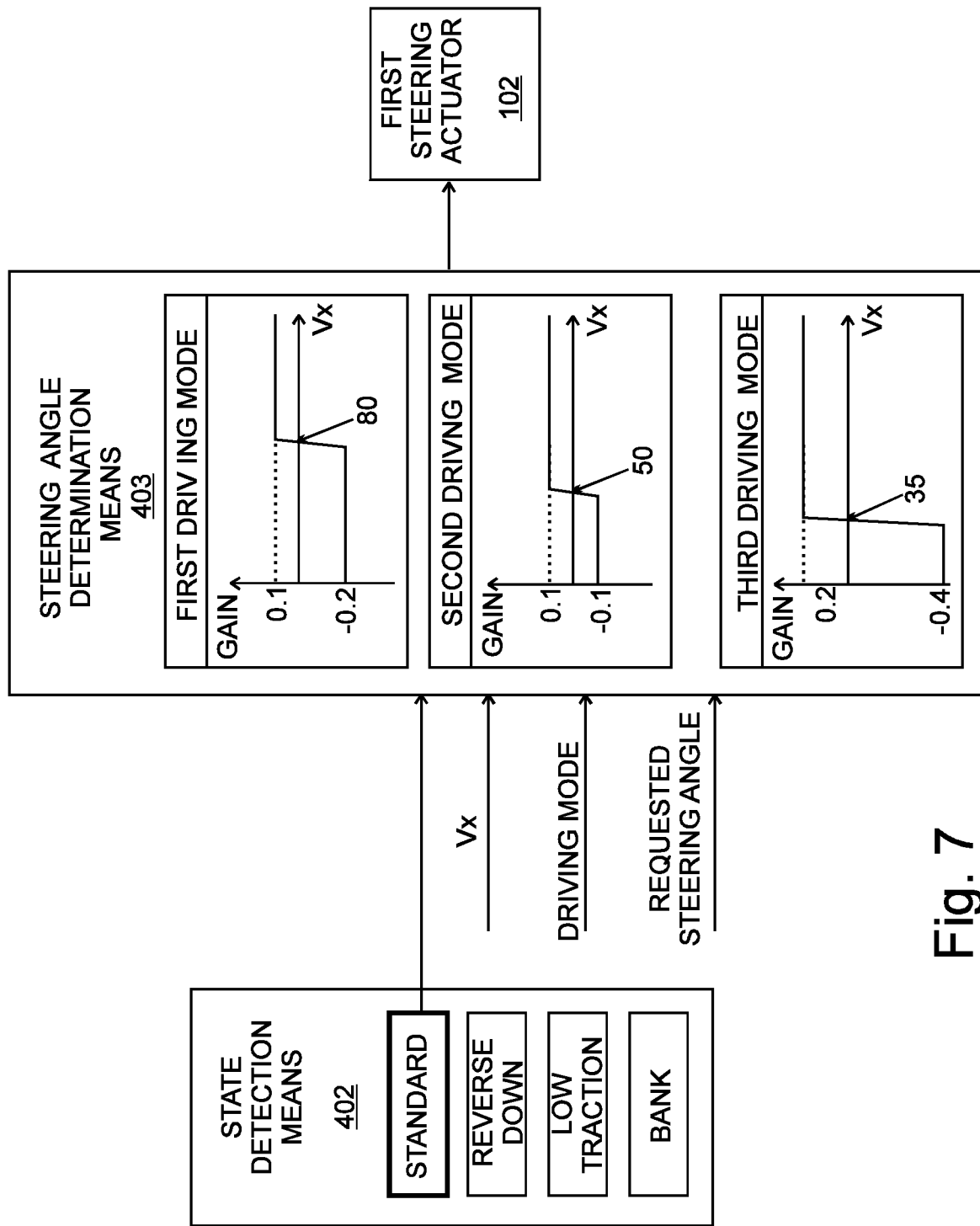
FIG. 7 shows a diagram illustrating the operation of the steering angle determination means in response to a determination that the vehicle is in its STANDARD condition.

Operation of the steering angle determination means 403 in response to a determination that the vehicle 100 is in its STANDARD condition is illustrated in FIG. 7. The steering angle determination means 403 receives an indication of the current longitudinal velocity (or speed) of the vehicle 100, the currently selected driving mode and the requested steering angle. The steering angle detection means 403 determines a proposed rear wheel steering angle that is dependent on the current driving mode. For each driving mode, the gain value that is used to multiply the requested steering angle to determine the proposed rear wheel steering angle is a function of the longitudinal velocity ($V_x$) as illustrated in FIG. 7. In each case, the gain value is negative for longitudinal velocities below a threshold speed and positive for longitudinal velocities above the threshold speed. However, the threshold speed depends on the driving mode. Also, the magnitude of the gain value, below and/or above the respective threshold speed, may also depend on the selected driving mode.

In the present example, for a first driving mode, which may be selected for driving on tarmac surfaced roads, the gain value is −0.2 when the longitudinal velocity is below a threshold speed of 80 kmph (kilometres per hour) and +0.1 when the longitudinal velocity is above that threshold speed. For a second driving mode, which may be selected for driving on low friction surfaces such as grass, gravel or snow, the gain value is −0.1 when the longitudinal velocity is below a threshold speed of 50 kmph and +0.1 when the longitudinal velocity is above that threshold speed. For a third driving mode, which may be selected for driving on low friction, deformable surfaces, such as sand, the gain value is −0.4 when the longitudinal velocity is below a threshold speed of 35 kmph and +0.2 when the longitudinal velocity is above that threshold speed.

Figure 8:
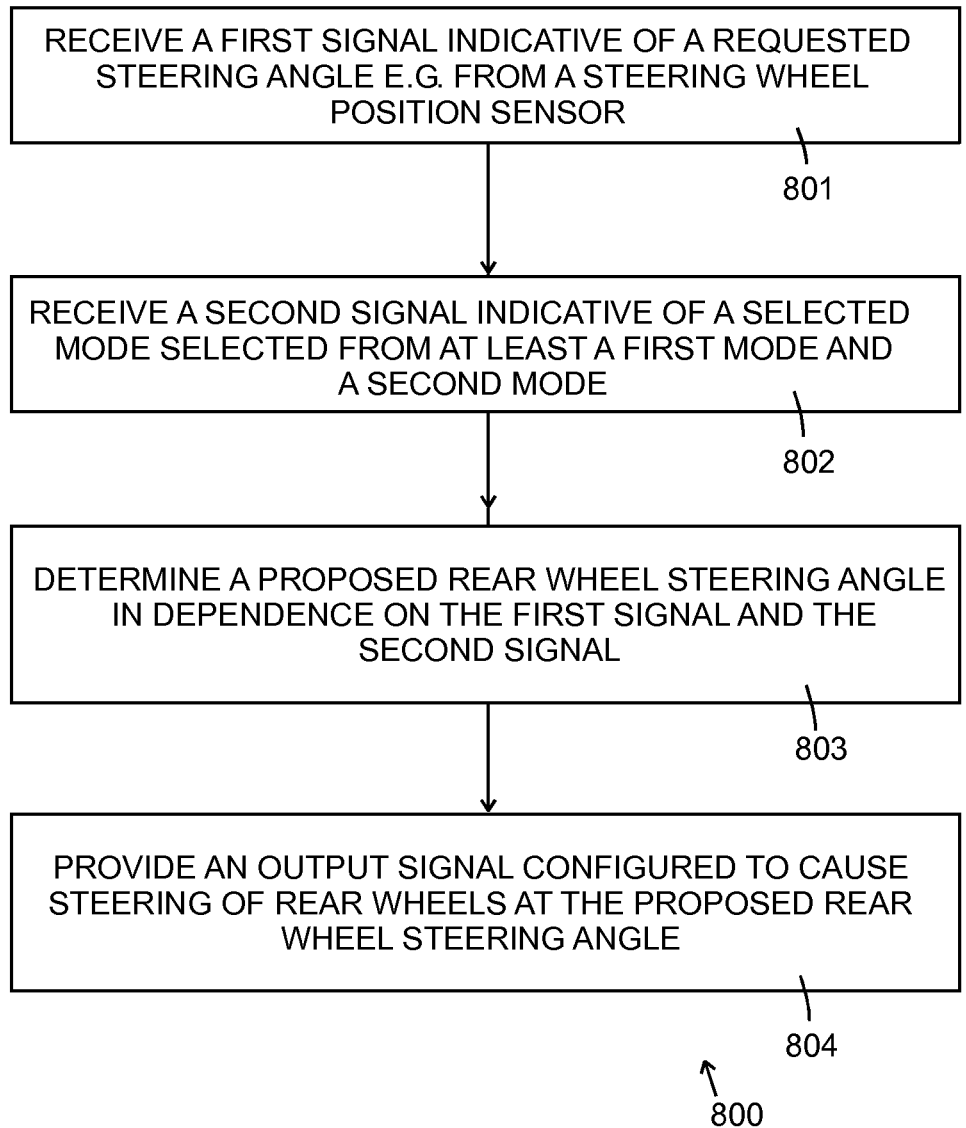
FIG. 8 shows a flowchart illustrating a method embodying the present invention and performable by the control means to control steering of rear wheels of the vehicle.

After determining the proposed rear wheel steering angle, by multiplying the requested steering angle by the appropriate gain value, the steering angle determination means 403 provides an output signal to the actuator 102 to cause steering of the rear wheels at the proposed steering angle A flowchart illustrating a method 800 embodying the present invention and performable by the control means 105 to control steering of rear wheels 103 of the vehicle 100 is shown in FIG. 8. At block 801 of the method 800, a first signal indicative of a requested steering angle is received. The first signal may be produced in response to a user input at a user input device, such as a steering wheel with an associated position sensor. Alternatively, the first signal may be produced by a vehicle automation system, such as a self-parking system or a self-driving system. In the embodiment of FIG. 1, the requested steering angle may also be the angle at which the front wheels 106 of the vehicle 100 are turned relative to its longitudinal axis (5001 in FIG. 5).

At block 802 a second signal is received indicative of a selected mode that is selected from at least a first mode and a second mode. The selected mode may be selected by a user input at a user input device 311 or selected automatically by a terrain estimation system 310, as described above.

At block 803 a proposed rear wheel steering angle is determined in dependence on the first signal and the second signal. Therefore, the proposed rear wheel steering angle depends on the requested steering angle and also on the currently selected mode. At block 804 an output signal is provided that is configured to cause steering of rear wheels 103 of the vehicle 100 at the proposed rear wheel steering angle. The method 800 may then be repeatedly performed to continuously steer the rear wheels 103 in accordance with further steering angle requests and/or new selections of the driving mode of the vehicle 100.

Figure 9:
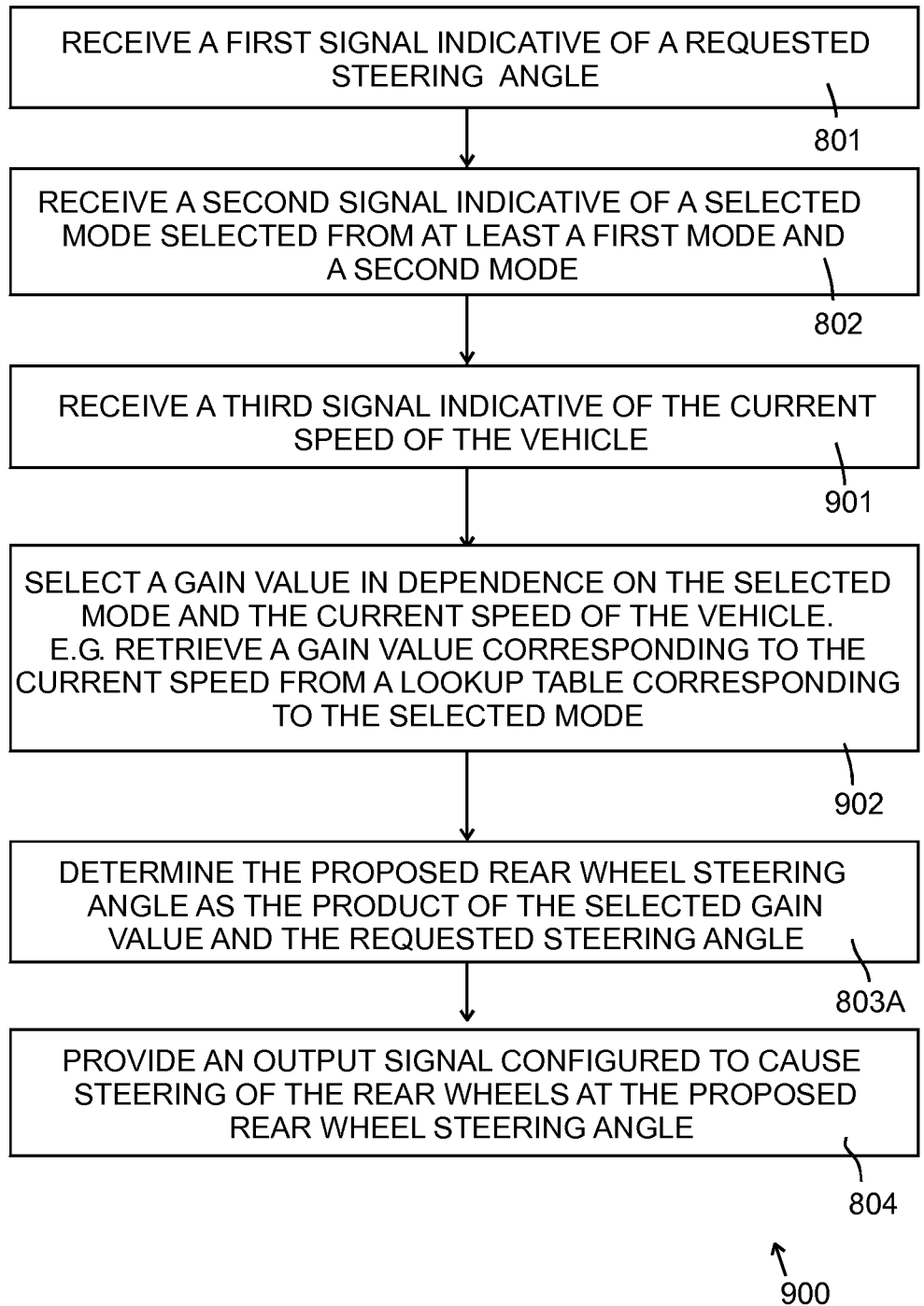
FIG. 9 shows a flowchart of a method, which provides a specific example of the method illustrated in FIG. 8.

A method 900, which provides a specific example of the method 800, is illustrated by the flowchart shown in FIG. 9. At block 801 of the method 900, a first signal indicative of a requested steering angle is received, and at block 802 a second signal is received indicative of a selected mode selected from at least a first mode and a second mode. Thus, blocks 801 and 802 of method 900 are the same as blocks 801 and 802 described above for method 800.

At block 901 a third signal indicative of a current speed of the vehicle 100, or the longitudinal velocity ($V_x$), is received. The third signal may comprise information of the current speed of the vehicle, or longitudinal velocity, or alternatively may comprise information enabling such a speed to be calculated. For example, the third signal may be received from wheel speed sensing means 304 and/or the IMU 305, or a position sensing system (not shown) such as a global navigation satellite system, such as GPS (global positioning system).

At block 902, a gain value is selected in dependence on the selected mode and the current speed indicated by the third signal. In the present embodiment, this is achieved using lookup tables. A gain value corresponding to the current speed indicated by the third signal is retrieved from a lookup table that corresponds to the selected mode. I.e. gain values corresponding to vehicle speeds are stored in a lookup table for each selectable mode, and at block 902 the lookup table for the selected mode is used to determine a gain value corresponding to the current vehicle speed. For low speeds that are below a threshold speed, the gain value is negative, and for higher speeds the gain value is positive. The threshold speed, at which the gain value changes sign, is dependent on the selected mode, for example as described above with reference to FIG. 7. In the event that a vehicle speed falls between two neighbouring speeds of the lookup table, a corresponding gain value may be determined by linear interpolation from the gain values of the two neighbouring speeds.

Whichever gain value is selected, at block 902, the selected gain value is then multiplied by the requested steering angle at block 803A to determine a proposed rear wheel steering angle. At block 804, an output signal is then provided, for example to actuator 102 of the vehicle 100, to cause steering of rear wheels of the vehicle 100 at the proposed steering angle.

Blocks of the method 900 may then be repeatedly performed to continuously steer the rear wheels in accordance with further requested steering angles, the current speed of the vehicle and/or new selections of the mode of the vehicle 100.

Figure 10:
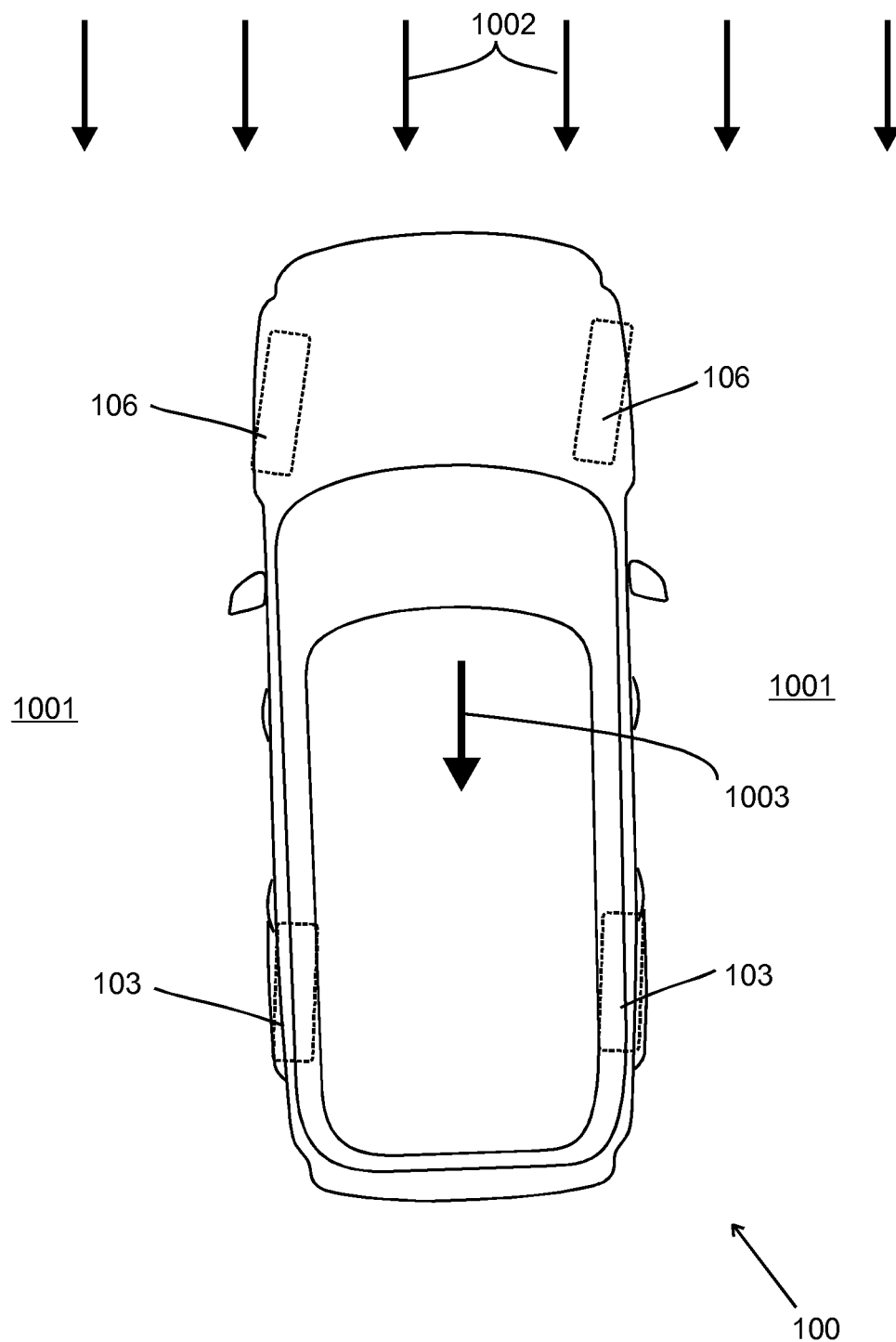
FIG. 10 shows a plan view of the vehicle travelling at a relatively low speed backwards down a sloping ground surface.

A first special condition of the vehicle 100, labelled REVERSE DOWN in FIG. 4 will now be described with reference to FIGS. 10 to 14. FIG. 10 shows a plan view of the vehicle 100 travelling at a relatively low speed backwards down a sloping ground surface 1001. Arrows 1002 indicate directions down along the ground surface 1001 and arrow 1003 represents the velocity of the vehicle 100, which is approximately parallel to the arrows 1002.

As discussed above with reference to FIGS. 5 and 6, it is known for vehicles with four steerable wheels to steer the rear wheels out of phase with the front wheels at low speeds, i.e. from speeds of 0 kmph up to a threshold speed. It is also known to steer the rear wheels out of phase with the front wheels when the vehicle 100 is reversing. However, as shown in FIG. 10, the vehicle 100 may be arranged, on some terrains such as sand, to steer the rear wheels 103 in phase with the front wheels when reversing down an incline. This prevents the front of the vehicle 100 swinging down the slope lower than desired when steering backwards down the slope. Therefore the stability of the vehicle 100 is increased in such a situation and the vehicle is easier to control. Also, in dependence on the steepness of the incline and/or the friction provided by its surface, and/or a selected driver mode, the vehicle 100 may be arranged not to steer the rear wheels at all.

Figure 11:
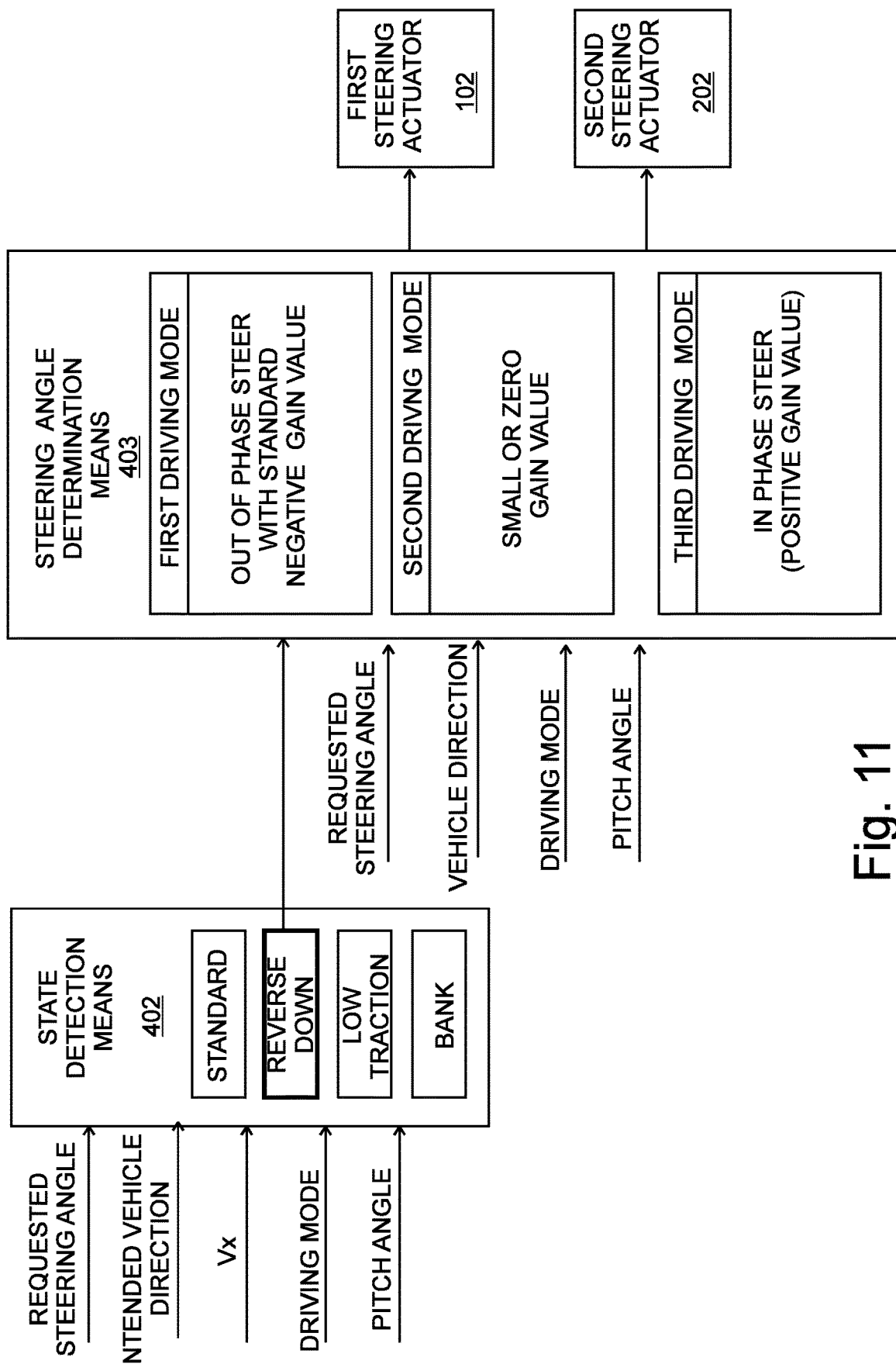
FIG. 11 shows a diagram illustrating the operation of the steering angle determination means in response to a determination that the vehicle is in its REVERSE DOWN condition.

Operation of the steering angle determination means 403 and the state detection means 402 when it determines that the vehicle 100 is in its REVERSE DOWN condition is illustrated in FIG. 11. The state detection means 402 receives: an indication of the pitch angle ($\theta_y$) of the vehicle 100 from the vehicle state estimation means 401; an indication (from the currently selected gear) of the intended direction (backwards or forwards) of the vehicle 100; an indication of the longitudinal velocity ($V_x$) of the vehicle, or alternatively the sign (positive or negative) of the longitudinal velocity; the currently selected driving mode; and the requested steering angle.

The state detection means 402 determines that the vehicle 100 is in a rearwards movement condition if the longitudinal velocity is negative, indicating rearwards movement. The rearwards movement may be due to intentional reversing of the vehicle 100, or due to the vehicle 100 sliding backwards down a slope when it has failed to climb up it, for example, due to the slope having a very low friction surface or due to it being composed of loose particulate material such as sand. In the present embodiment, the state detection means 402 also determines that the vehicle 100 is in a rearwards movement condition, even if it is stationary, if the intended vehicle direction (indicated by reverse gear being selected) is backwards.

In dependence on the pitch angle ($\theta_y$) being above a threshold pitch angle and a determination that the vehicle 100 is in a rearwards movement condition, the state detection means 402 determines the vehicle is in the REVERSE DOWN condition. In dependence on such a determination, the steering angle determination means 403 determines a proposed rear wheel steering angle in dependence on the requested steering angle.

In the present embodiment, the proposed steering angle is also determined in dependence on the currently selected driving mode. For example, in dependence on a first driving mode being selected, which may be a standard mode for driving on tarmac surfaced roads and the like, a proposed rear wheel steering angle is determined by multiplying a negative gain value (such as that selected for the STANDARD condition) and the requested steering angle. Consequently the rear wheels 103 are steered out of phase with the front wheels 106. This provides the vehicle 100 with good manoeuvrability, which may be advantageous, for example when parking.

Alternatively a second driving mode may be selected, which may be a mode for driving on low friction and/or rough surfaces, such as grass, gravel, snow, a muddy rutted surface, or a rocky rough surface. In dependence on such a second driving mode being selected, a proposed rear wheel steering angle may be determined using a gain value with a small magnitude compared to the gain value used for the first driving mode. In an example, the gain value used for the second driving mode is zero, and so the rear wheels 103 are caused to be held at zero degrees.

Alternatively a third driving mode may be selected, which may be a mode for driving on deformable material such as sand. As described with reference to FIG. 10, in dependence on such a third driving mode being selected, a proposed rear wheel steering angle may be determined as the product of the requested steering angle and a positive gain value, so that the rear wheels 103 are steered in phase with the front wheels 106.

In an alternative embodiment, in which all road wheels 103, 106 are steer-by-wire, like those of FIG. 2, in at least one driving mode, in dependence on determining a rearwards movement condition and determining that the pitch angle of the vehicle is greater than a threshold pitch angle, the control means 105 causes the vehicle 100 to steer backwards by steering the rear wheels 103 only. In this embodiment, the steering angle determination means 403 is configured to cause the front wheels 106 to be locked in position at zero degrees and to determine a proposed rear wheel steering angle proportional to the requested steering angle. In another alternative embodiment, in which all road wheels 103, 106 are steer-by-wire, as in FIG. 2, in at least one driving mode in dependence on determining a rearwards movement condition and determining that the pitch angle of the vehicle is greater than a threshold pitch angle, the control means 105 causes steering of the vehicle 100 to be primarily performed by the rear wheels 106. In such a scenario, the control means 105 may cause steering by all road wheels 103, 106 in proportion to the requested steering angle received from the steering input sensor 119 but the rear wheels 103 are steered through larger angles than the front wheels 106.

Figure 12:
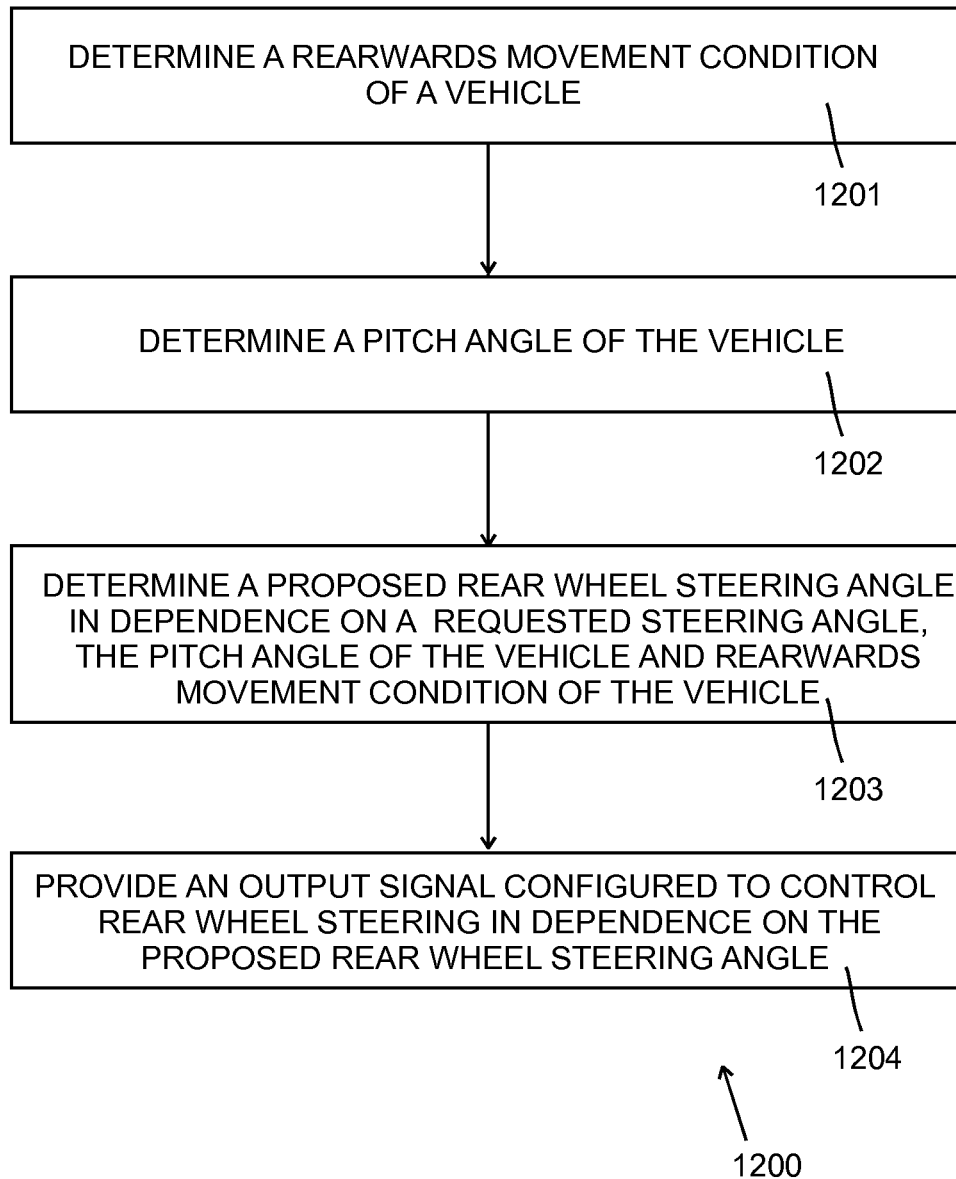
FIG. 12 shows a flowchart illustrating a method embodying the present invention and performable by the control means to control steering of rear wheels of the vehicle when reversing down a slope.

A flowchart illustrating a method 1200 embodying the present invention and performable by the control means 105, to control steering of rear wheels 103 of the vehicle 100 when reversing down a slope, is shown in FIG. 12. At block 1201 a rearwards movement condition of a vehicle 100 is determined. This may comprise receiving a signal indicating that a reverse gear of the vehicle 100 has been selected or reverse movement of the vehicle 100 has been detected.

At block 1202 the pitch angle of the vehicle 100 is determined. This may comprise receiving a signal indicative of the pitch angle from another processing means, or determining the pitch angle from signals received from sensing means such as a gyroscope device or an inertial measurement unit 305.

At block 1203 a proposed rear wheel steering angle is determined in dependence on a requested steering angle, the pitch angle and the rearwards movement condition of the vehicle 100. At block 1204 an output signal is provided, which is configured to control steering of the rear wheels 103 of the vehicle 100 in dependence on the proposed rear wheel steering angle. The output signal may be provided to an actuator 102 for controlling steering of the rear wheels of the vehicle 100, so that the actuator turns the rear wheels 103 to the proposed rear wheel steering angle.

Figure 13:
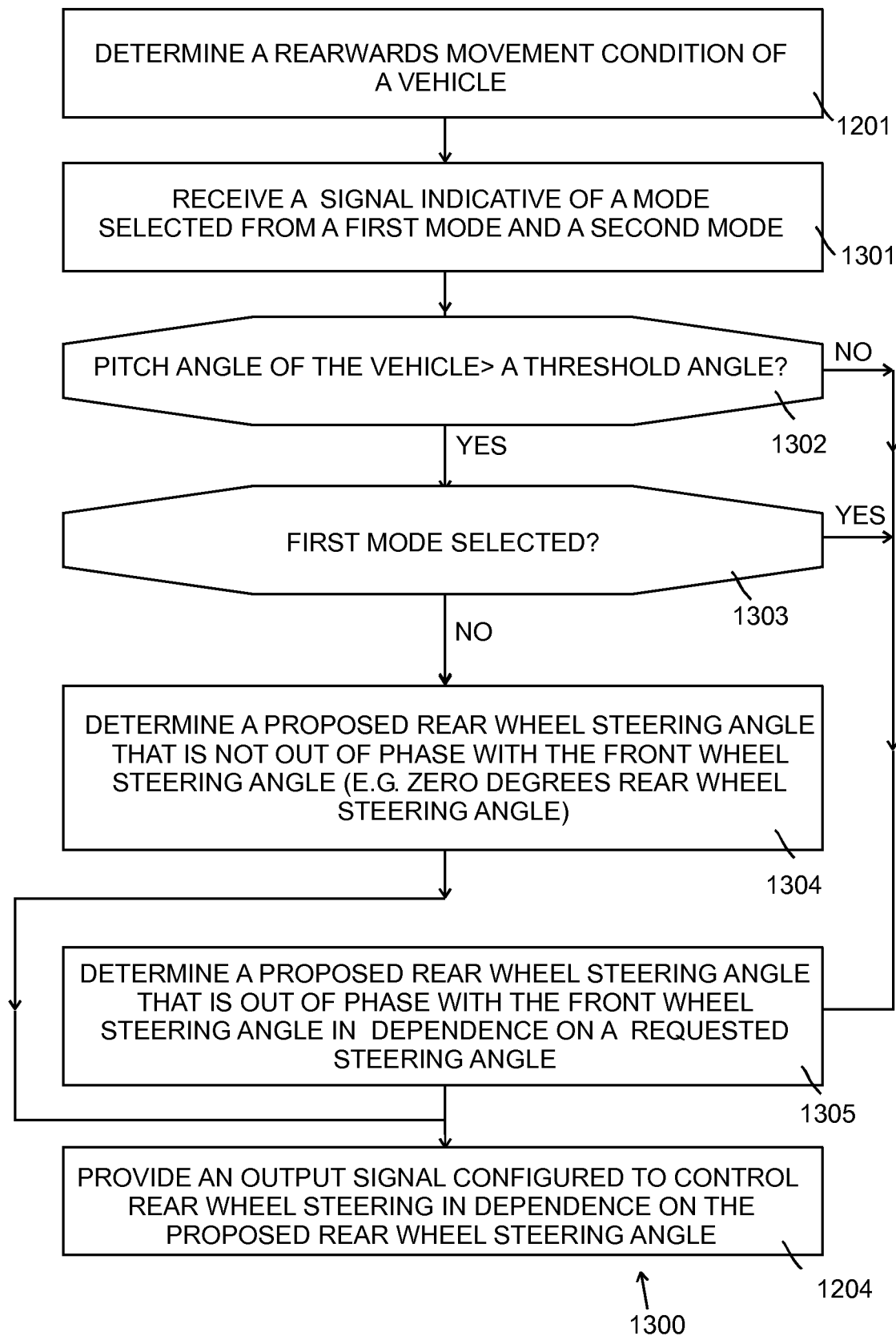
FIG. 13 shows a flowchart illustrating a method, which provides an example of the method illustrated in FIG. 12.

A method 1300, which provides an example of the method 1200, is illustrated by the flowchart shown in FIG. 13. At block 1201 a rearwards movement condition of a vehicle 100 is determined, and at block 1301 a signal is received that is indicative of a driving mode selected from at least a first mode and a second mode. For example, the signal may be received from a user input device 311 in response to a user selection or from a terrain estimation system 310 as described above with reference to FIG. 3. At block 1302 it is determined whether the pitch angle of the vehicle 100 is greater than a threshold pitch angle. If it is not, at block 1305 a proposed rear wheel steering angle, which is out of phase with the front wheel steering angle, is determined in dependence on a requested steering angle. I.e., the proposed rear wheel steering angle is the product of the front wheel steering angle and a negative gain value.

Alternatively, if it is determined at block 1302 that the pitch angle of the vehicle 100 is greater than the threshold pitch angle, it is then determined at block 1303 whether a first mode is currently selected. For example, the first mode may be indicative of the vehicle being used on a terrain where stability of the vehicle 100 when reversing down an incline is not an issue. For example, the first mode may be indicative of the vehicle 100 being used on a tarmac road and/or indicative of friction between the road wheels 103, 106 of the vehicle 100 and the terrain being above a friction threshold.

In an embodiment, the threshold pitch angle used at block 1302 is a constant value of, for example, 10 degrees, but in other embodiments the threshold pitch angle is dependent on the currently selected driving mode.

If it is determined that the first mode is selected then the aforementioned process at block 1305 is performed. Alternatively, if it is determined at block 1303 that another mode is currently selected, for example suitable for use on a low friction surface or a deformable surface such as sand, a proposed rear wheel steering angle is determined at block 1304. The determination at block 1304 produces a proposed rear wheel steering angle that is not out of phase with the front wheel steering angle. As described above, the proposed steering angle may be calculated using a gain value of zero, or close to zero (i.e. below 0.1), for low friction surfaces, or a positive gain value for deformable surfaces such as sand.

Following the determination of the proposed steering angle at block 1304 or block 1305, an output signal is provided at block 1204 configured to control rear wheel steering in dependence on the proposed rear wheel steering angle.

Figure 14:
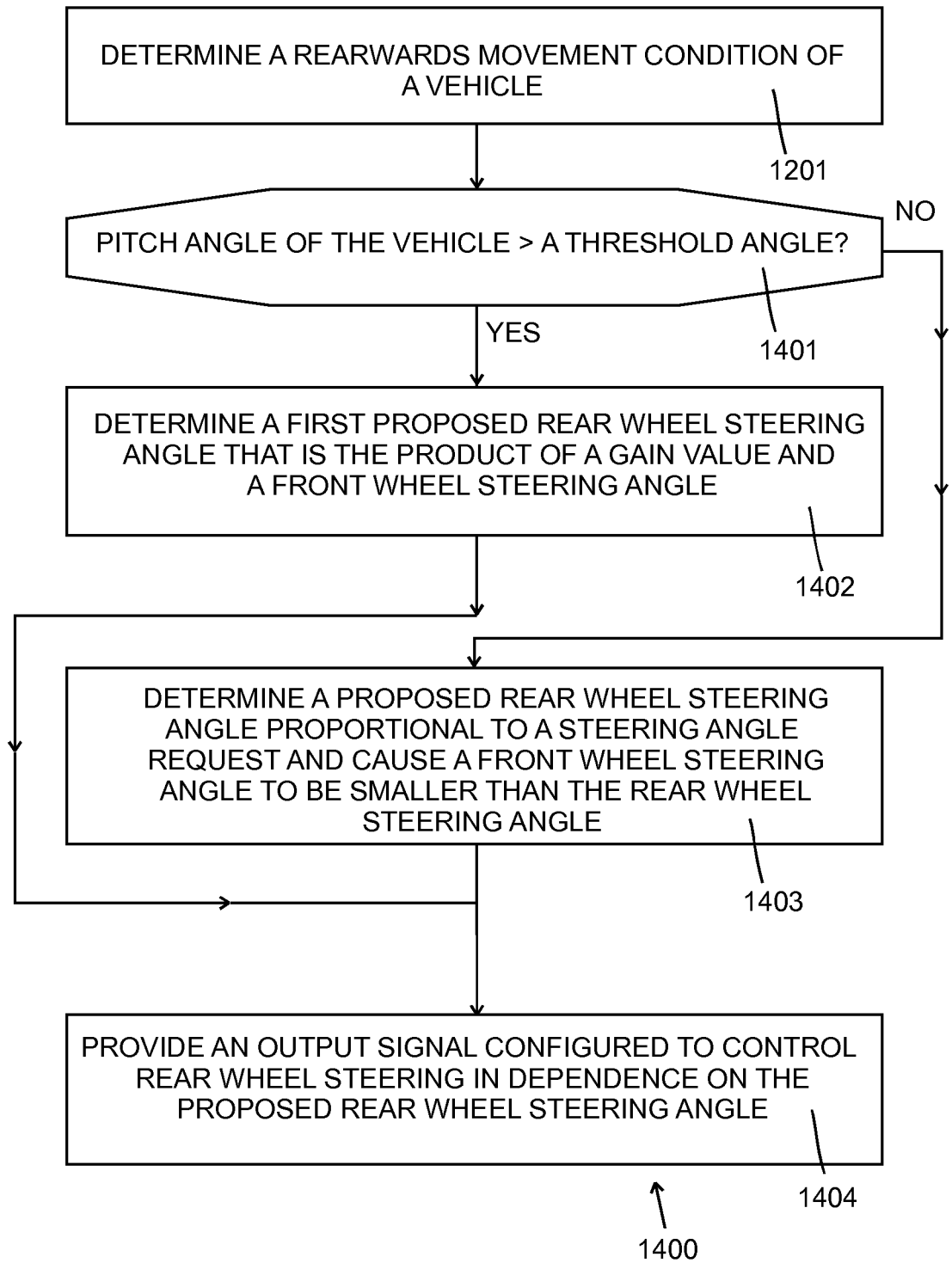
FIG. 14 shows a flowchart illustrating a method, which provides an alternative example of the method illustrated in FIG. 12.

An alternative method 1400, which provides a second example of the method 1200, is illustrated by the flowchart shown in FIG. 14. At block 1201 a rearwards movement condition of a vehicle 100 is determined, and at block 1401 it is determined whether the pitch angle of the vehicle is greater than a threshold pitch angle. If it is not, a first proposed rear wheel steering angle is determined at block 1402 that is the product of a gain value and a front wheel steering angle. Alternatively, if it is determined at block 1401 that the pitch angle of the vehicle is greater than the threshold pitch angle, a proposed rear wheel steering angle is determined that is proportional to the requested steering angle. In addition, the front wheels 106 of the vehicle 100 are caused to be steered through angles that are proportional to the requested steering angle but smaller than those of the rear wheels 103, so that the vehicle 100 is primarily steered by the rear wheels 103. In one embodiment, the front wheels 106 may be locked at zero degrees and the vehicle 106 is only steered by the rear wheels 103. At block 1404 an output signal is provided, for example to actuator 102, to control steering of the rear wheels in dependence on the proposed rear wheel steering angle. Thus, the front wheels are locked and steering is performed using the rear wheels only.

Figure 15:
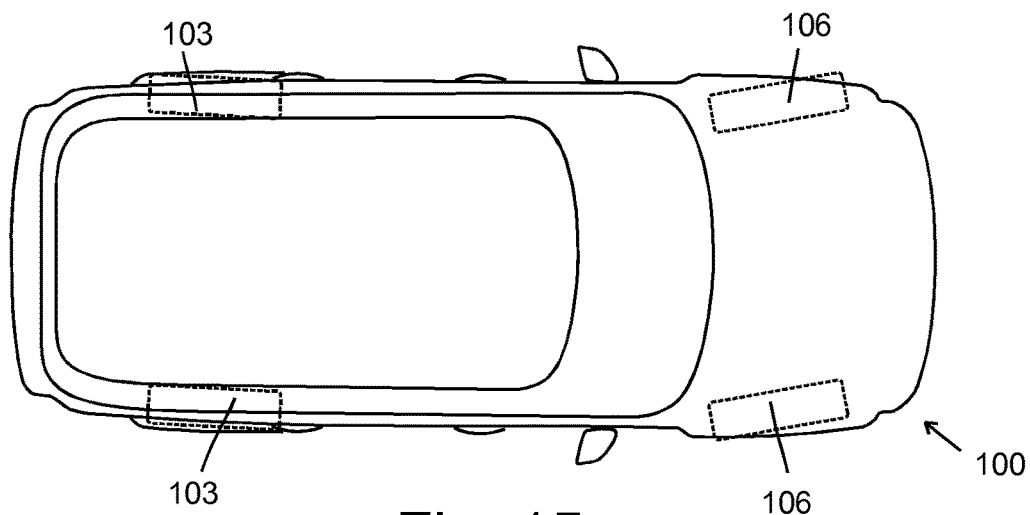
FIG. 15 shows a plan view of the vehicle moving forwards at a relatively low speed.

A second special condition of the vehicle 100, labelled LOW TRACTION in FIG. 4 will now be described with reference to FIGS. 15 to 21. FIG. 15 shows a plan view of the vehicle 100 moving forwards at a relatively low speed. The vehicle 100 is in its STANDARD condition and its front wheels 106 are turned to the left to enable the vehicle to be steered leftwards. The rear wheels 103 are being steered out of phase with the front wheels 106 to enhance the manoeuvrability of the vehicle 100. As described above, the angle through which the rear wheels 103 are turned is the product of the angle through which the front wheels are turned and a gain value.

Figure 16:
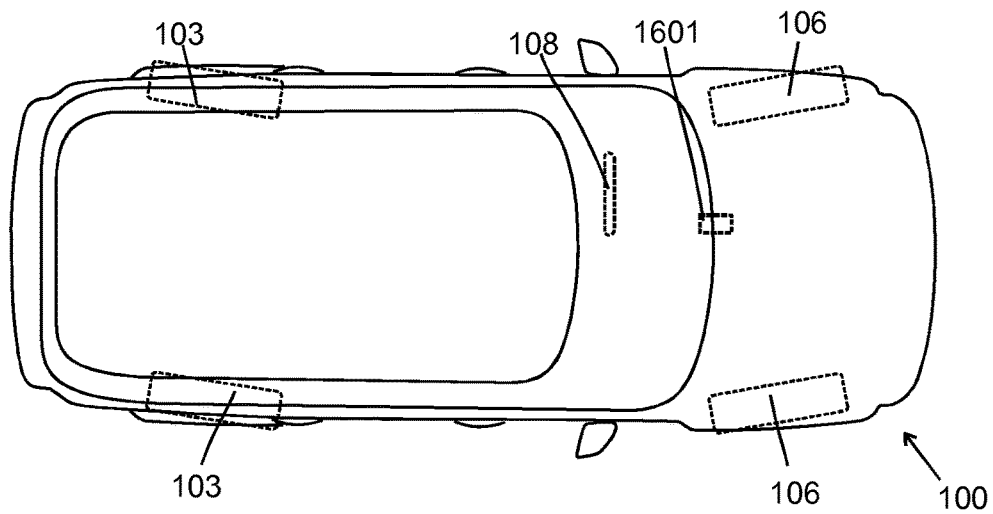
FIGS. 16 and 17 show plan views of the vehicle during a procedure to free the vehicle when it has become stuck or is making only very slow progress due to low traction.
Figure 17:
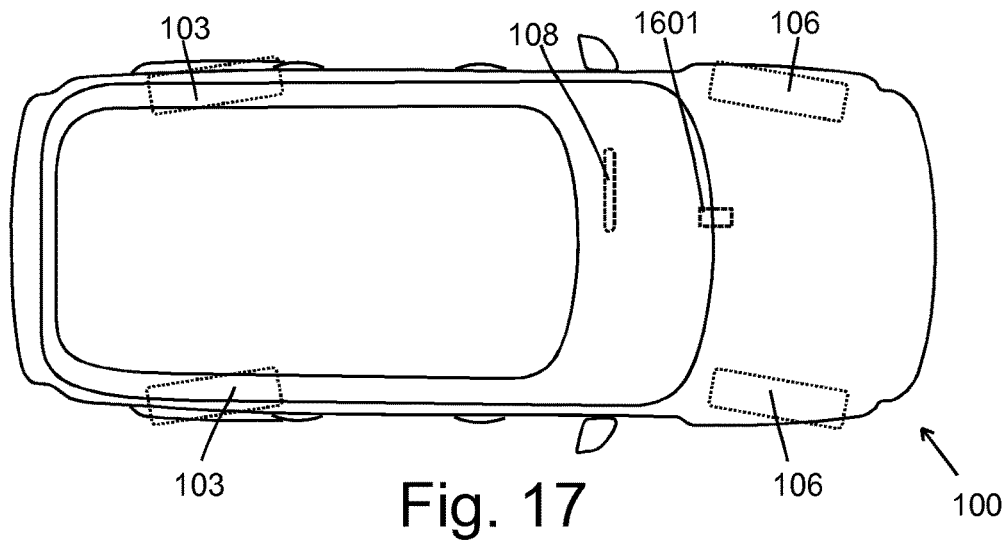

FIGS. 16 and 17 show plan views of the vehicle 100 during a procedure to free the vehicle when it is unable to make forward progress due to one or more of the road wheels 103, 106 being located in a depression in the ground and the ground providing very low friction and/or being deformable. For example, the ground surface may be formed of mud, snow or sand. A similar procedure may be performed when the vehicle 100 is making very slow progress due to only very low traction being obtainable by the tyres of the vehicle 100. In order to free the vehicle from the location in which it is stuck and/or enable the vehicle to make progress, the driver of the vehicle 100 requests torque from the powertrain of the vehicle 102 by actuation of its accelerator pedal 1601 and oscillates its steering wheel 108 to cause the front wheels 106 to oscillate between a leftwards orientation shown in FIG. 16 and a rightwards orientation shown in FIG. 17. The oscillation of the front wheels assists the front wheels 106 to obtain additional grip and/or reduce the depression in which the wheels 106 are located. For example, on muddy ground additional grip may be obtained by the action of the side walls of the tyres of the wheels 106 against ruts in which the tyres are located, or on loose sand, a depression in which the wheels 106 reside may be reduced in depth by the action of the tyres pulling additional sand into the depression.

In FIGS. 16 and 17, the control means 105 has identified that the vehicle 100 is in a LOW TRACTION condition and consequently the angle through which the rear wheels 103 are steered is determined using a relatively large gain value compared to the gain value used in the STANDARD condition illustrated in FIG. 15. In the present embodiment, a gain value of −1 is used to determine the proposed steering angle for the rear wheels 103 so that the rear wheels 103 are steered in a similar way to the front wheels 106 but out of phase with the front wheels 106. Consequently, the oscillation of the rear wheels 103 assists in the process of enabling the vehicle 100 to make forward progress in a similar way to the oscillation of the front wheels 106.

Figure 18:
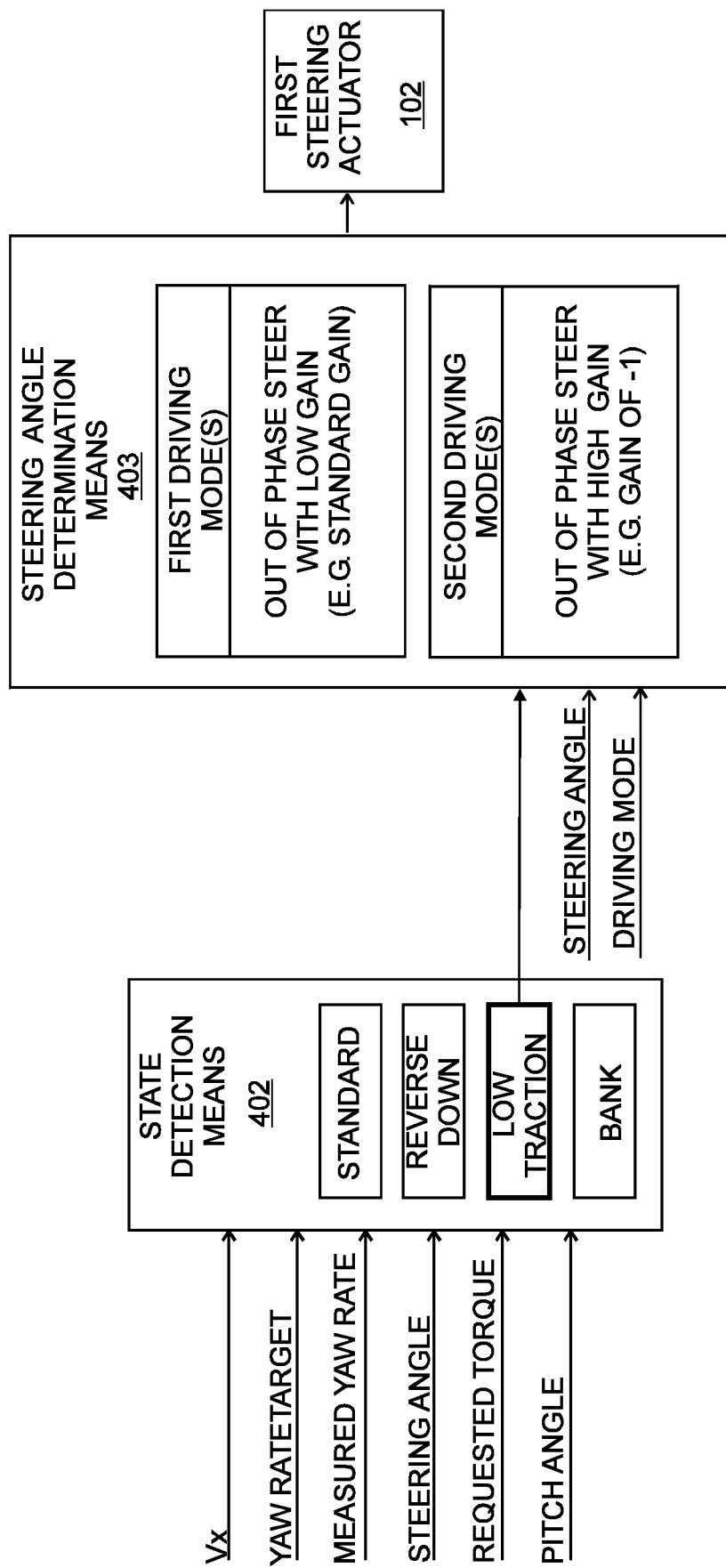
FIG. 18 shows a diagram illustrating operation of the steering angle determination means and the state detection means when it determines that the vehicle is in a LOW TRACTION condition.

Operation of the steering angle determination means 403 and the state detection means 402 when it determines that the vehicle 100 is in a LOW TRACTION condition is illustrated in FIG. 18. The state detection means 402 is configured to receive indications of the longitudinal velocity ($V_x$) of the vehicle 100, the requested steering angle, a throttle position (or powertrain torque request), a yaw rate target and a measured yaw rate of the vehicle 100. From these indications, the state detection means 402 determines whether the vehicle 100 is in a LOW TRACTION condition in dependence on a set of criteria being met.

A first one of the criteria is a determination that the front wheel steering angle is oscillating with a frequency above a threshold frequency, i.e. the front wheels are being steered repeatedly leftwards and then rightwards at a frequency that is greater than a threshold frequency. In an embodiment, the threshold frequency is 0.5 Hz.

A second criterion comprises that the requested torque from the powertrain is above a threshold torque value, or that the accelerator pedal is being actuated by the driver of the vehicle.

As mentioned above, a yaw rate target is determined by the vehicle state estimation means 401 from the steering angle and the estimate of the longitudinal velocity ($V_x$) of the vehicle over the ground using a mathematical model. The state detection means 402 is configured to calculate a yaw rate error by determining the difference between the measured yaw rate and the target yaw rate. If the vehicle 100 is travelling over the ground at a speed that is approximately equal to that measured by the wheel speed sensing means 304, the yaw rate target should be approximately equal to the measured yaw rate, i.e. the yaw rate error should be very small. However, if the vehicle 100 is stuck, or is making only very slow progress, while to the road wheels 103, 106 are spinning at a relatively high rate, the measured yaw rate becomes much lower than the yaw rate target, i.e. the yaw rate error is large. A third criterion to determine that the vehicle is stuck, or is not making good progress due to low grip, is that the yaw rate error is above a threshold error value. In an embodiment, the threshold error value is 8 degrees per second, but in other embodiments the threshold error values are between 5 and 10 degrees per second.

An additional criterion may comprise a determination that the pitch angle of the vehicle 100 is not above a threshold pitch angle, because then the lack of forward movement of the vehicle 100 may be caused by a failed climb. In which case, the REVERSE DOWN condition is determined in preference to the LOW TRACTION condition, so that the steering of the rear wheels 103 is configured to safely enable the vehicle 100 to be steered backwards down the slope.

If the criteria are met, the state detection means 402 determines a LOW TRACTION condition and the steering angle determination means 403 determines a proposed rear wheel steering angle in dependence on the requested steering angle and a relatively high negative gain value. In an embodiment, whenever a LOW TRACTION condition is determined, the steering angle determination means 403 calculates the proposed rear wheel steering angle by multiplying the requested steering angle by a high negative gain value, such as −1. However, in the present embodiment, the gain value that is used also depends on the currently selected driving mode. For a driving mode useable for driving on rough high friction surfaces, such as rocky ground, the magnitude of the gain value may be chosen to be relatively low, e.g. less than 0.2, and possibly the gain value may be kept at the standard gain value used for the vehicle in its STANDARD condition. For all other driving modes a relatively high gain value, such as −1, may be used The actuator 102 for steering the rear wheels 103 may not enable the rear wheels 103 to be steered at such large angles as those enabled by the front wheel steering mechanism. However, having determined the proposed rear wheel steering angle, the steering angle determination means 403 provides an output to the actuator 102 to cause steering at the proposed rear wheel steering angle, as far as possible.

Figure 19:
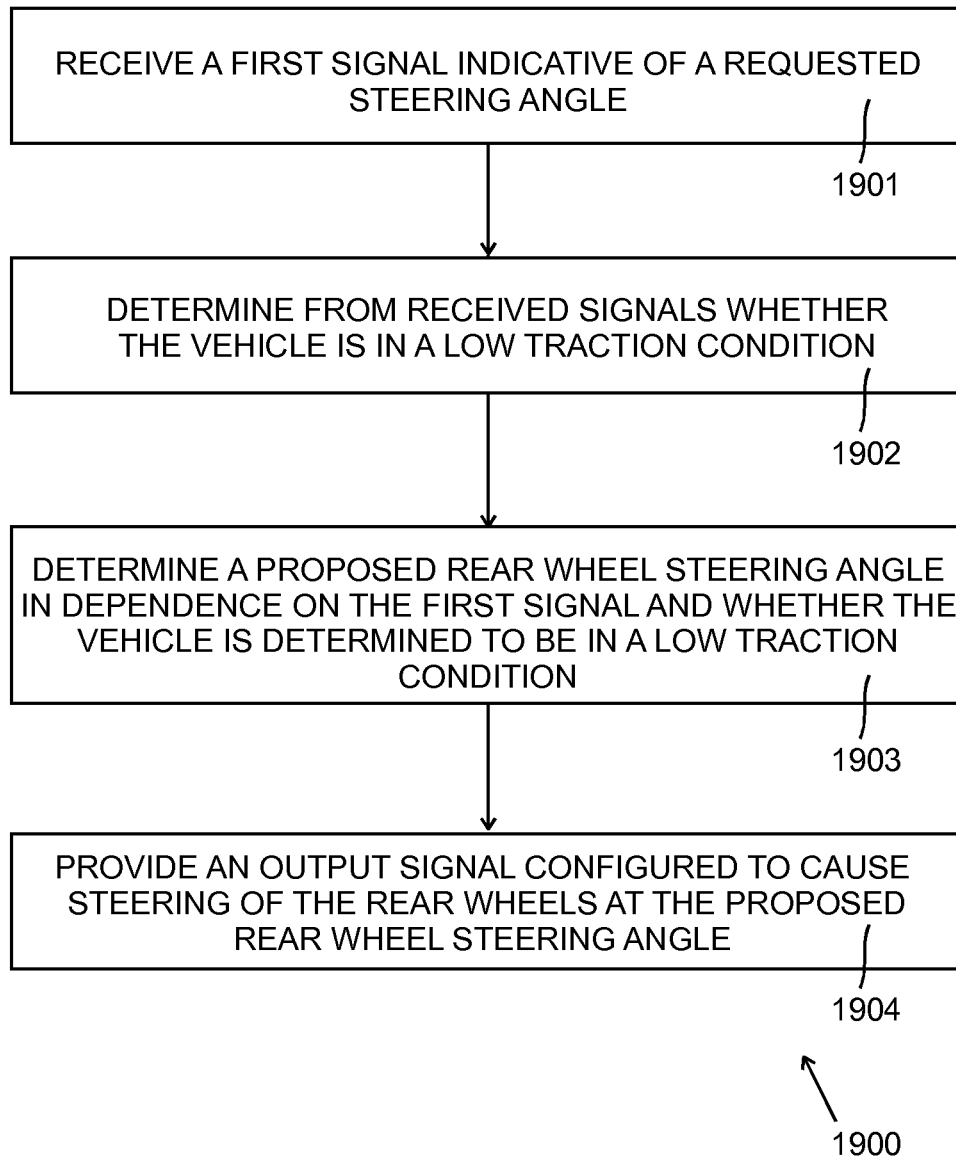
FIG. 19 shows a flowchart illustrating a method embodying the present invention and performable by the control means to control steering of rear wheels of the vehicle when it is in a LOW TRACTION condition.

A flowchart illustrating a method 1900 embodying the present invention and performable by the control means 105 to control steering of rear wheels 103 of the vehicle 100 is shown in FIG. 19. At block 1901 of the method 1900 a first signal is received that is indicative of a requested steering angle, and at block 1902 it is determined from received signals whether the vehicle 100 is in a LOW TRACTION condition. At block 1903 a proposed rear wheel steering angle is determined in dependence on the first signal and whether the vehicle 100 is determined to be in a LOW TRACTION condition, and at block 1904 an output signal is provided, for example to the actuator 102, to cause steering of the rear wheels at the proposed rear wheel steering angle.

Figure 20:
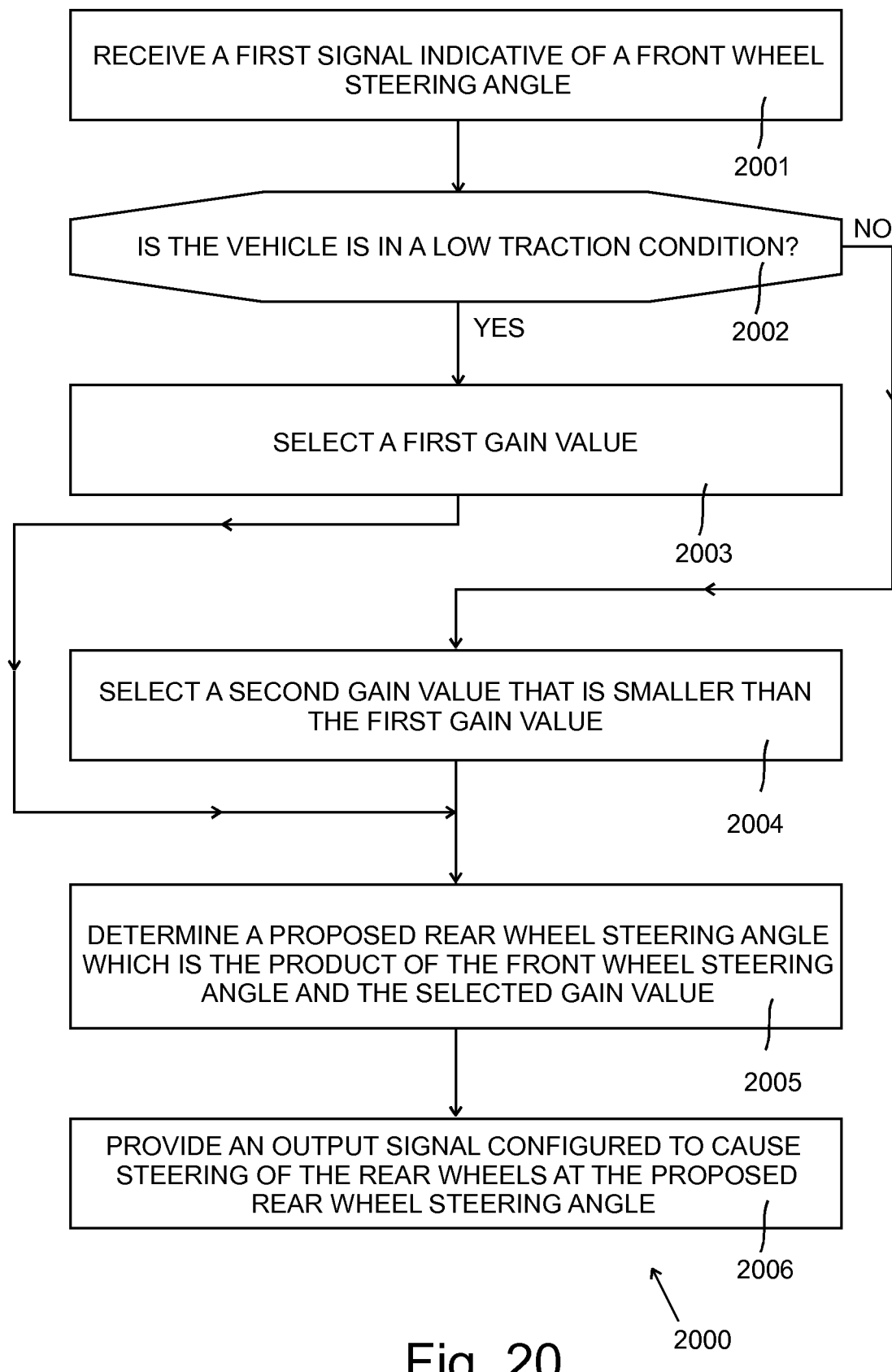
FIG. 20 shows a flowchart illustrating a method, which provides an example of the method illustrated in FIG. 19.

A method 2000 providing an example of the method 1900 is illustrated by the flowchart shown in FIG. 20. At block 2001 a first signal is received that is indicative of a requested steering angle. At block 2002 it is determined whether the vehicle 100 is in a LOW TRACTION condition and, if it is, a first gain value is selected at block 2003. Alternatively if it is determined that the vehicle 100 is not in a LOW TRACTION condition, a second gain value that is smaller than the first gain value is selected at block 2004. As mentioned above, the first gain value may be −1 or close to −1 (e.g. at least −0.5) while the second gain value is comparatively small being the gain value that is selected when the vehicle 100 is determined to be in another state, such as its STANDARD condition.

Whichever gain value is selected, a proposed rear wheel steering angle is determined at block 2005 by multiplying the front wheel steering angle by the selected gain value. An output signal is then provided at block 2006 to cause steering of the rear wheels 103 at the proposed rear wheel steering angle.

Figure 21:
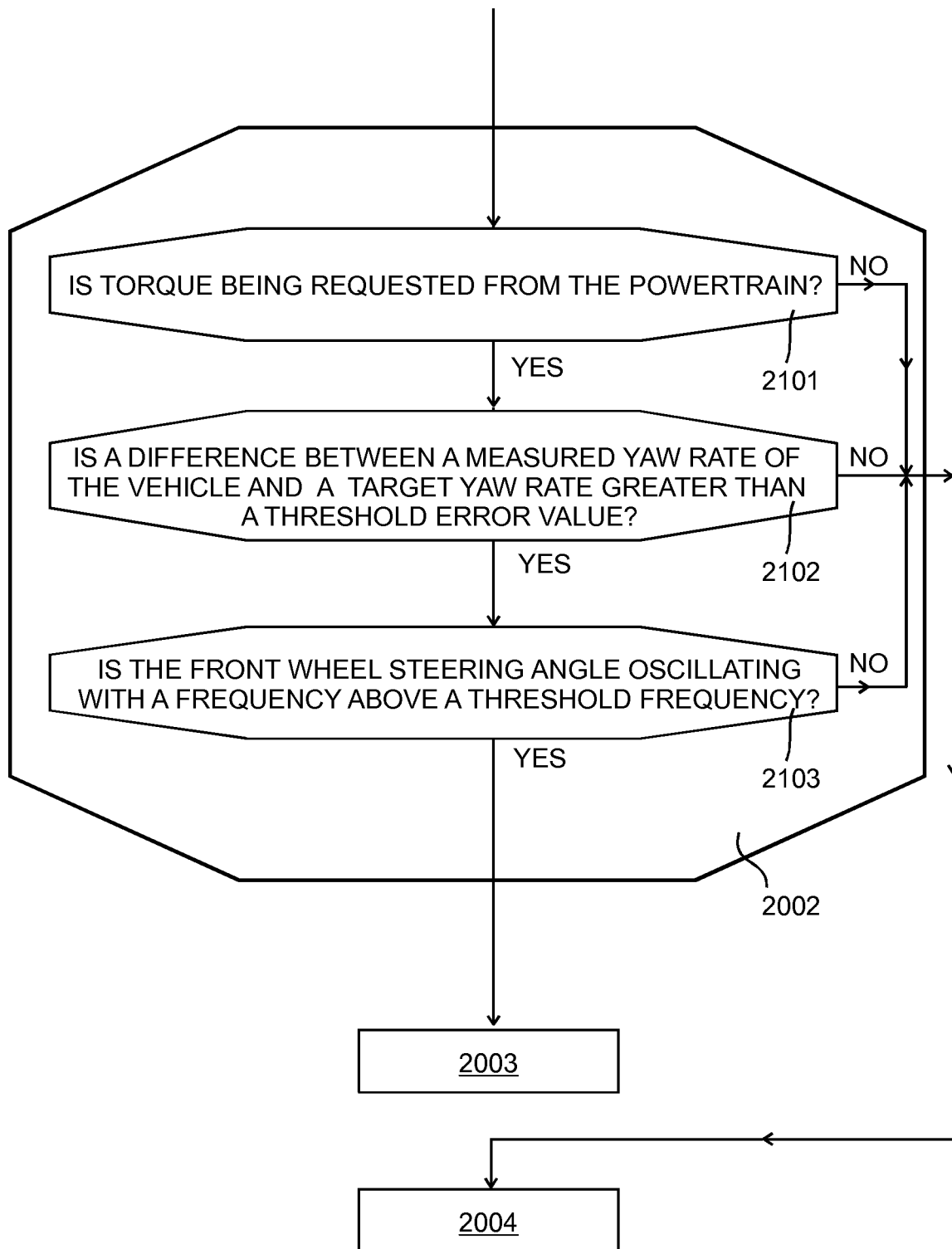
FIG. 21 shows a flowchart illustrating a method that provides an example of the method illustrated by FIG. 20.

An example of the process at block 2002 of determining whether the vehicle 100 is in a LOW TRACTION condition is illustrated in the flowchart of FIG. 21. At block 2101 of the process, it is determined whether torque from the powertrain of the vehicle 100 is being requested. If torque is being requested, it is determined at block 2102 whether a difference between a measured yaw rate of the vehicle 100 and a target yaw rate is greater than a threshold error value. If the difference is greater than the threshold error value then it is determined at block 2103 whether the front wheel steering angle is oscillating with a frequency that is greater than a threshold frequency. If the oscillation has a frequency that is greater than the threshold frequency then the vehicle 100 is determined to be in a LOW TRACTION condition and the first gain value is selected at block 2003.

If any of the determinations at blocks 2101 to 2103 provide a negative result the vehicle 100 is determined not to be in a LOW TRACTION condition and the second gain value is selected at block 2004.

Figure 22:
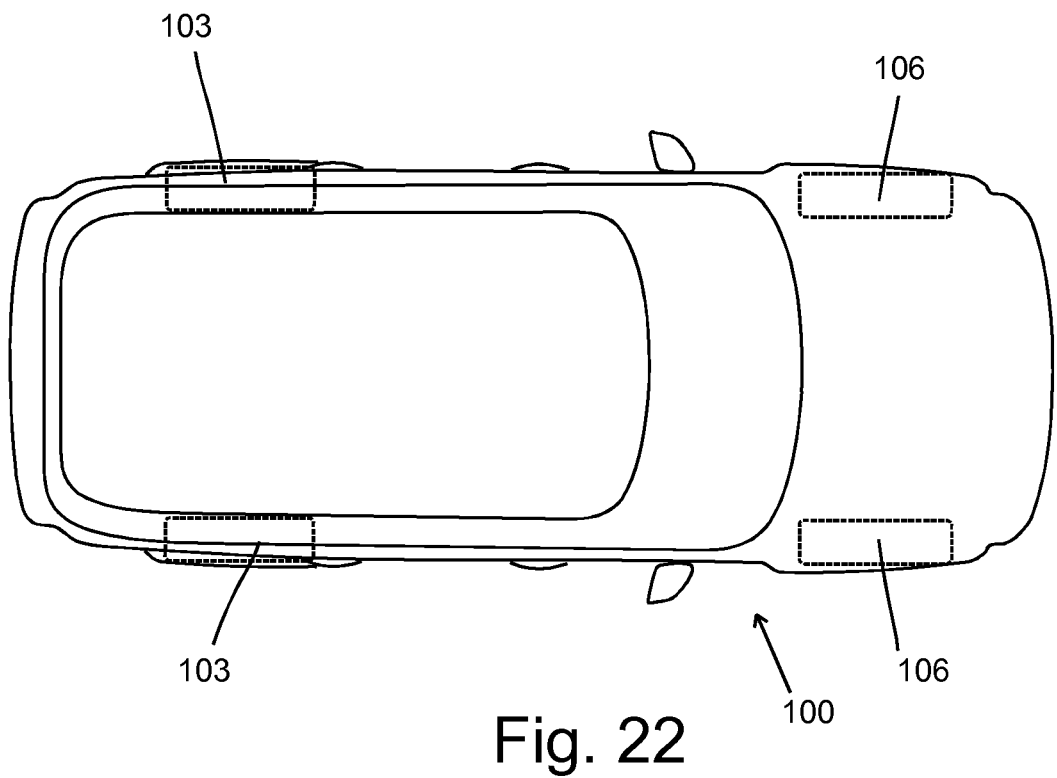
FIG. 22 shows a plan view of the travelling in a forward direction in its STANDARD condition.

A third special condition of the vehicle 100, labelled BANK in FIG. 4 will now be described with reference to FIGS. 22 to 29. FIG. 22 shows a plan view of the vehicle 100 travelling in a forward direction in its STANDARD condition. The front wheels 106 are oriented with a steering angle of zero degrees and consequently the rear wheels 103 are also oriented with a steering angle of zero degrees.

Figure 23:
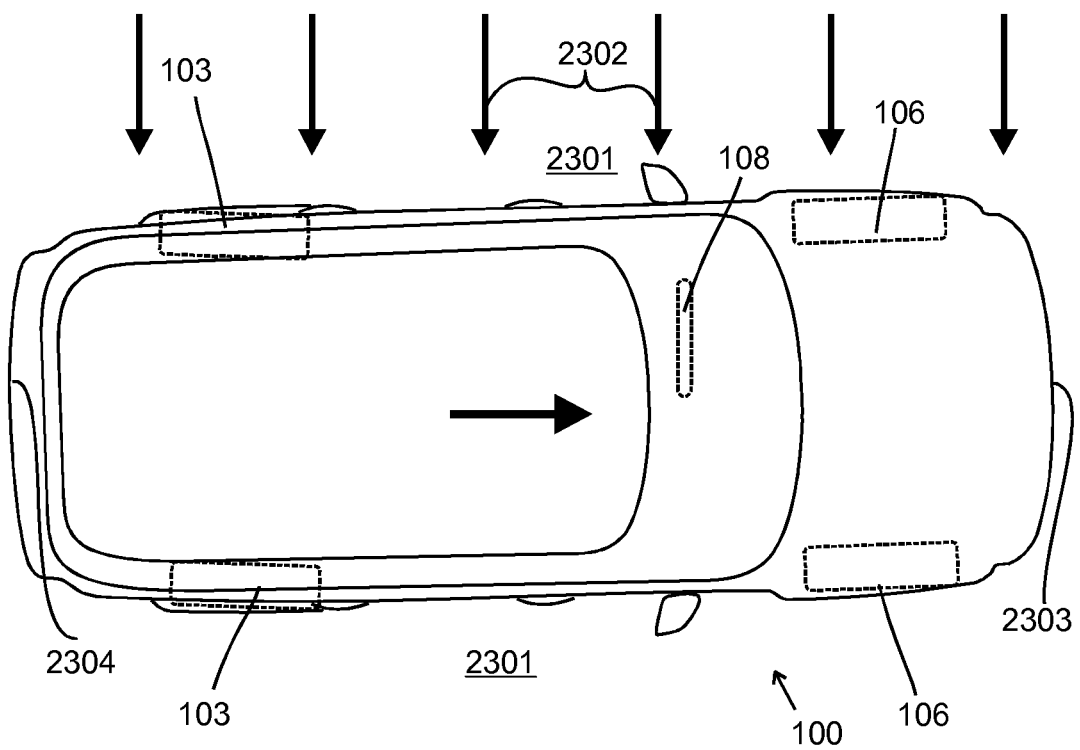
FIG. 23 shows a plan view of the vehicle travelling in a forward direction in its BANK condition.

A plan view of the vehicle 100 is shown in FIG. 23 travelling in a forward direction in its BANK condition. In FIG. 23 the vehicle 100 is travelling along a bank 2301 with the left side of the vehicle 100 higher up the bank 2301 than the right side of the vehicle 100. The arrows 2302 in FIG. 23 indicate steepest directions down the bank 2301, and the vehicle 100 is travelling in a direction that is substantially perpendicular to the arrows 2302 to maintain a constant height up the bank 2301.

When travelling along a bank in this way, there is a tendency for gravity to have an effect on a vehicle, such that the front of a conventional vehicle is caused to slide lower down the bank than the rear of the vehicle and the vehicle is pulled down the bank. To compensate for this effect, an experienced driver may steer slightly up the bank in order to keep the vehicle moving in a desired direction along the bank. However, as shown in FIG. 23, the vehicle 100 provides steering of the rear wheels 103 so that the direction of the vehicle 100 is along the bank 2301 as desired by its driver, without the driver having to provide steering to compensate for the effect of the bank 2301. Specifically the rear wheels 103 are steered (in this example to the right) to direct the rear 2303 of the vehicle 100 lower down the bank 2301 than the front 2304 of the vehicle 100, while the front wheels 106 remain at a zero steering angle. Thus, the vehicle 100 is oriented so that its longitudinal axis is pointing slightly up the slope but, due to the effect of gravity, the vehicle 100 travels along the bank 2301 at a constant height, as desired.

The control means 105 is configured to automatically cause steering of the rear wheels 103 in this manner when it detects that the vehicle 100 is travelling on a bank 2301 that is sloped at an angle that is greater than a threshold angle. The magnitude of the angle of steering of the rear wheels 103, while the front wheels 106 are steered at zero degrees, depends upon how steep the bank 2301 is. It also depends on what driving mode is currently selected. For example, on a bank 2301 formed of sand, e.g. a side of a sand dune, the steering angles of the rear wheels 103 may be arranged to be relatively large to compensate for the relatively large effect that the bank 2301 has on the vehicle 100 when compared to the effect that a solid bank 2301 with a high friction surface would have.

While the vehicle 100 is travelling along a bank 2301, as shown in FIG. 23, if a steering input is received to turn the vehicle 100 either up or down the bank 2301, for example by a driver using the steering wheel 108, the front wheels 106 are steered in accordance with the steering input and the control means 105 reduces the angle of steer of the rear wheels 103 by a proportional amount. Thus, the rear wheel steering angle has a maximum angle when the front wheel steering angle is zero degrees. As the steering input causes the front wheel steering angle to increase further, the angle of steering of the rear wheels 103 is further proportionally reduced, until the rear wheel steering angle is zero when the front wheel steering angle is at a threshold steering angle. The threshold steering angle may be between about 0 and 15 degrees, depending on the bank angle. (It should be noted that this threshold angle is a road wheel angle of the front wheels, and not a steering wheel angle.) As the front wheel steering angle increases above the threshold angle, the rear wheel steering angle may be maintained at zero, until the steering angle of the front wheels 103 reaches a second, higher threshold angle, at which point the control means 105 reverts to the standard condition in which the rear wheel steering angle is proportional to the front wheel steering angle. For example, at relatively low speeds on a sand dune, the rear wheels 103 are steered out of phase with the front wheels 106 to provide the vehicle 100 with enhanced manoeuvrability, which may enable the driver of the vehicle 100 to steer off the bank 2301.

Figure 24:
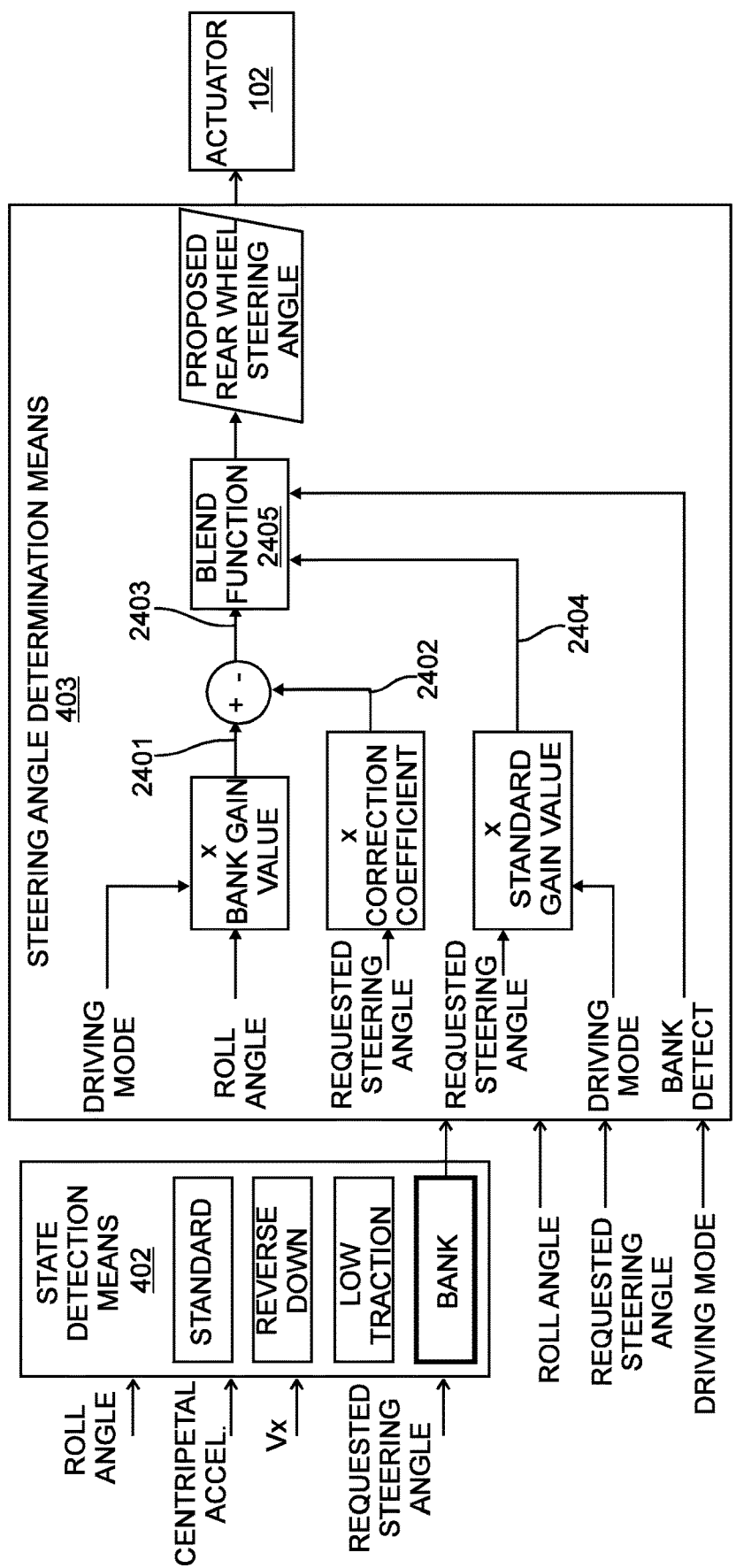
FIG. 24 shows a diagram illustrating the operation of the steering angle determination means and the state detection means when it determines that the vehicle is in its BANK state.

Operation of the steering angle determination means 403 and the state detection means 402 when it determines that the vehicle 100 is in its BANK state is illustrated in FIG. 24. The state detection means 402 receives an estimated roll angle $(\theta_x)$ of the vehicle 100, from the vehicle state estimation means 401. The estimated roll angle $(\theta_x)$ is calculated by the vehicle state estimation means 401 by sensor fusion of the measurements of rate of roll $(\omega_x)$ and lateral acceleration $(a_y)$ received from the IMU 305. The BANK condition is only determined by the state detection means 402 when the received roll angle $(\theta_x)$ exceeds a threshold roll angle for more than a predefined period of time.

In the present embodiment the state detection means 402 also receives indications of the centripetal acceleration, longitudinal velocity $(V_x)$ of the vehicle 100 and requested steering angle. The centripetal acceleration may be calculated by the vehicle state estimation means 401 from the rate of yaw $(\omega_z)$ and the longitudinal velocity $(V_x)$, as is known. In the present embodiment, the state detection means 402 only determines that the vehicle 100 is in the BANK condition when the received roll angle $(\theta_x)$ exceeds the threshold roll angle while the centripetal acceleration is below a threshold value for more than the predefined period of time. By requiring the centripetal acceleration to be below a threshold value enables the state detection means 402 to avoid identifying a roll angle caused by centripetal acceleration as a roll angle caused by the vehicle 100 being on a bank.

In the present embodiment, the state detection means 402 also only determines that the vehicle 100 is in the BANK condition when the current longitudinal velocity (or speed) is below a maximum speed threshold and the requested steering angle is smaller than a maximum steering angle.

When the BANK condition is determined by the state detection means 402, the steering angle determination means 403 determines a proposed rear wheel steering angle in dependence on the requested steering angle, the roll angle ($\theta_x$) and, in the present embodiment, the currently selected driving mode.

To achieve this, the received roll angle ($\theta_x$) is multiplied by a bank gain value to determine a bank steering angle 2401 at which the rear wheels 103 may be steered when the requested steering angle is zero. In the present embodiment, the bank gain value is selected in dependence on the currently selected driving mode. The bank gain value may be selected in dependence on the friction provided by the surface on which the vehicle 100 is travelling. Typically the selected bank gain value is relatively large when the driving mode is selected for travelling over a terrain formed of deformable material such as sand, and may be less when the terrain comprises a low friction surface such as grass, gravel or snow. For a solid high friction surface, such as tarmac, the bank gain value may be relatively very small. Alternatively, it may be a criterion for determination of the BANK condition by the state detection means 402 that the selected driving mode is not one that is selected for solid, high friction surfaces such as tarmac. I.e. For such a surface the vehicle 100 continues to remain in its STANDARD condition when travelling along banks.

The requested steering angle is multiplied by a correction coefficient to determine a correction angle 2402. The magnitude of the bank steering angle 2401 is then reduced by the correction angle 2402 to determine a corrected bank steering angle 2403. I.e. whether the requested steering angle is up or down the bank, the magnitude of the bank steering angle 2401 is reduced by an amount equal to the correction angle 2402.

When the vehicle 100 has been travelling along a bank for more than a short period of time, for example more than 2 seconds, the rear wheels 103 may be successfully steered at the corrected bank steering angle 2403. However, in order to provide stability to the vehicle 100 and enable the driver to easily keep control as the vehicle 100 drives onto a bank, the steering angle determination means 403 is configured to provide a smooth transition from the steering angle of the rear wheels 103 in the STANDARD condition and the steering angle of the rear wheels 103 in the BANK condition. To achieve this, when the BANK condition is detected, the steering angle determination means 403 continues to calculate a standard rear wheel steering angle 2404 by multiplying the requested steering angle by a standard gain value, i.e. as described above with reference to FIGS. 5 to 9. The corrected bank steering angle 2403 and the standard rear wheel steering angle 2404 are then combined by a blend function 2405 to produce the proposed rear wheel steering angle.

The blend function 2405 is configured to produce the proposed rear wheel steering angle by adding a portion of the corrected bank steering angle 2403 to a portion of the standard rear wheel steering angle 2404 during an initial period following an indication that the BANK condition is detected. Over that initial period, the portion of the corrected bank steering angle 2403 is steadily increased with time from zero, while the portion of the standard rear wheel steering angle 2404 is steadily decreased with time down to zero. After the initial period the blend function 2405 determines the proposed rear wheel steering angle to be equal to the corrected bank steering angle 2403.

The steering angle determination means 403 provides output signals to the actuator 102 to cause the actuator 102 to steer the rear wheels 103 at the proposed rear wheel steering angle.

In an embodiment, such as that of FIG. 2, in which the vehicle 100 has steer-by-wire front wheels 106, the steering angle determination means 403 may be configured to automatically control steering of the front wheels 106 in dependence on the roll angle of the vehicle 100, in addition to, or instead of, controlling steering the rear wheels 103. In this embodiment, when the vehicle 100 is driven along a bank at a substantially constant height with one side of the vehicle 100 higher than the other side (i.e. so that the roll angle is not zero), the front wheels 106 are automatically steered to cause the front of the vehicle 100 to be raised higher on the bank than the rear of the vehicle 100, without the driver providing a steering input.

Figure 25:
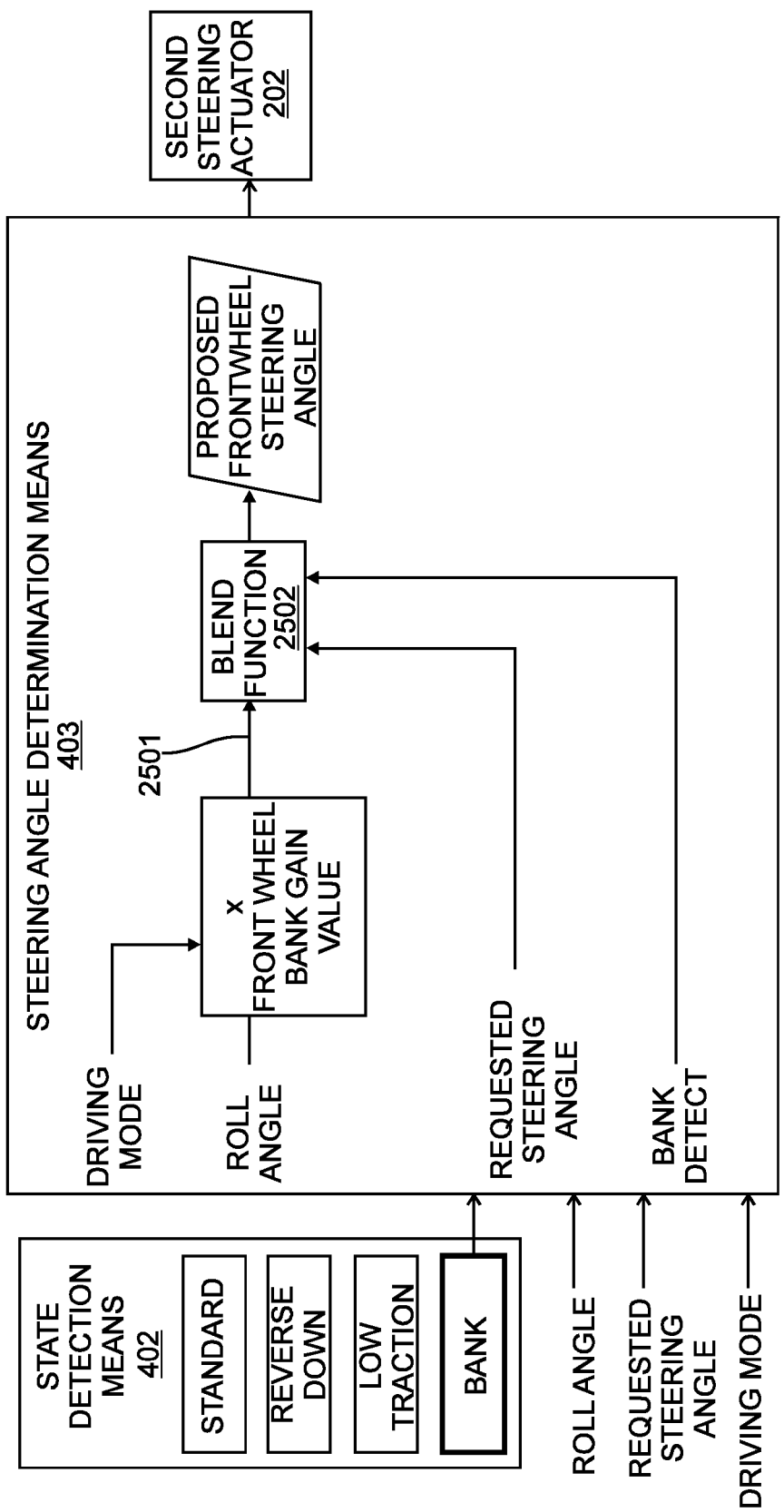
FIG. 25 shows an example of the operation of the steering angle determination means for such a vehicle with steer-by-wire front wheels.

An example of the operation of the steering angle determination means 403 for such a vehicle 100 with steer-by-wire front wheels 106 is shown in FIG. 25. When the vehicle 100 is determined to be in its BANK condition, a bank steering angle 2501 is determined by multiplying the roll angle of the vehicle 100 by a front wheel bank gain value. A fraction of the bank steering angle 2501 is added to the requested steering angle by a blend function 2502 to produce the proposed front wheel steering angle. The fraction of the bank steering angle 2501 that is added by the blend function 2502 is steadily increased from zero to one over a predefined period, of about 1 second, following the time at which the BANK condition is detected. After that predefined period has elapsed, the whole of the bank steering angle is added to the requested steering angle.

It should be understood that the addition takes account of the sign (positive or negative) of the angles, so that a negative bank steering angle when added to a positive requested steering angle results in a proposed front wheel steering angle with a magnitude that is the difference in the magnitudes of the requested steering angle and the bank steering angle.

It will be appreciated that such automated steering of front wheels in response to detection of a BANK condition may also be applied to a vehicle having front wheels that are steer-by-wire and rear wheels that are not steerable.

Figure 26:
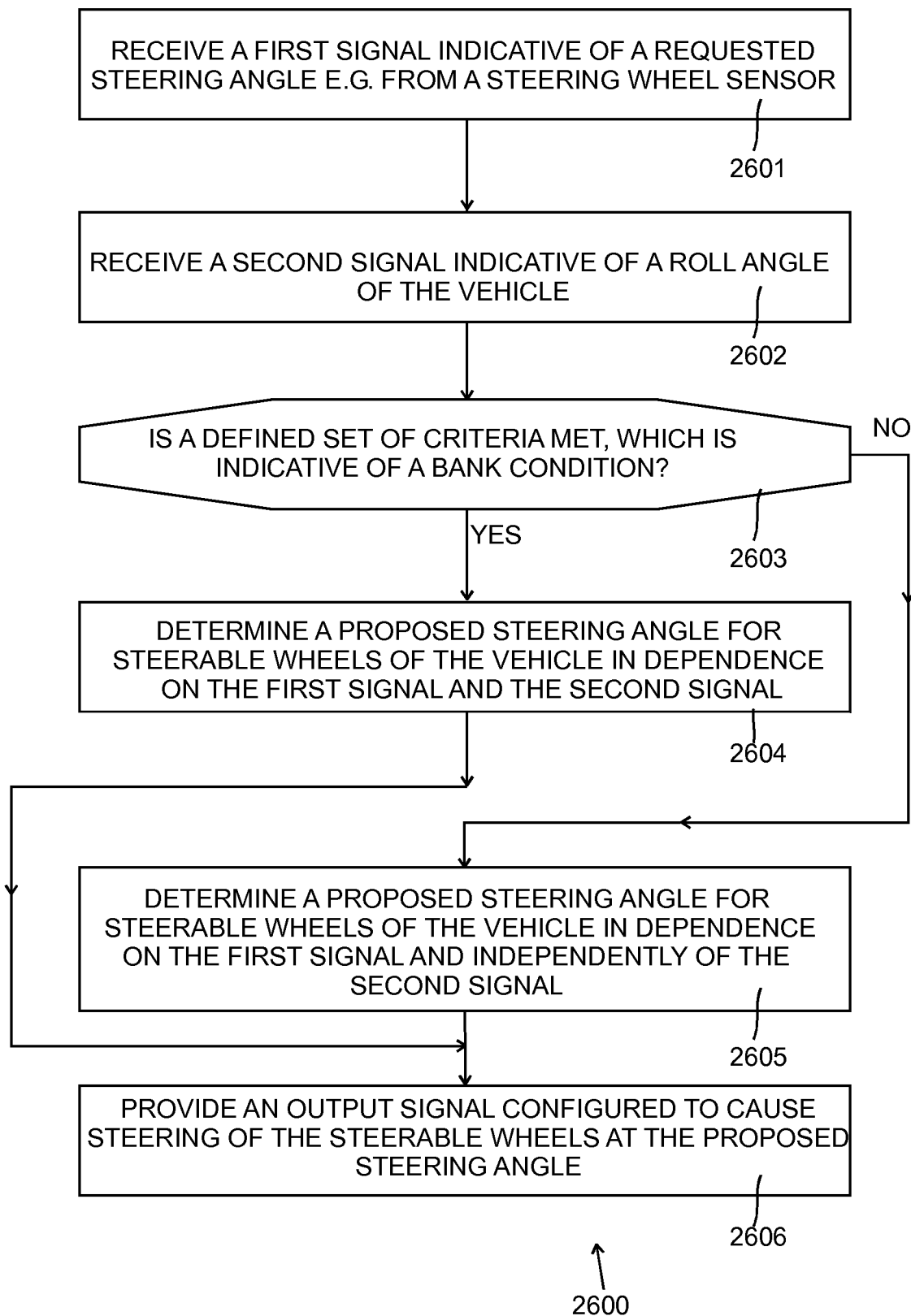
FIG. 26 shows a flowchart illustrating a method embodying the present invention and performable by the control means to control steering of rear wheels of the vehicle in its BANK condition.

A flowchart illustrating a method 2600 embodying the present invention and performable by the control means 105 to control steering of rear wheels 103 of the vehicle 100 is shown in FIG. 26. At block 2601 of the method 2600, a first signal indicative of a requested steering angle is received, and at block 2602 a second signal indicative of a roll angle of the vehicle is received. At block 2603 it is determined whether a set of predefine criteria have been met, which indicate that the vehicle 100 is in a BANK condition. If not all of the criteria have been met, then a proposed steering angle for steerable wheels of the vehicle 100 is determined in dependence on the first signal and without regard to the second signal, at block 2605. Alternatively, if all the criteria are found to have been met at block 2603, indicating that the vehicle 100 is in a BANK condition, then a proposed steering angle for steerable wheels of the vehicle 100 is determined in dependence on the first signal (indicative of the requested steering angle) and the second signal (indicative of the roll angle of the vehicle) at block 2604. Following the process at block 2604 or block 2605, an output signal is provided at block 2606 that is configured to cause steering of the steerable wheels at the proposed steering angle. The method 2600 is repeatedly performed in order to control the steerable wheels of the vehicle 100 during travel.

Figure 27:
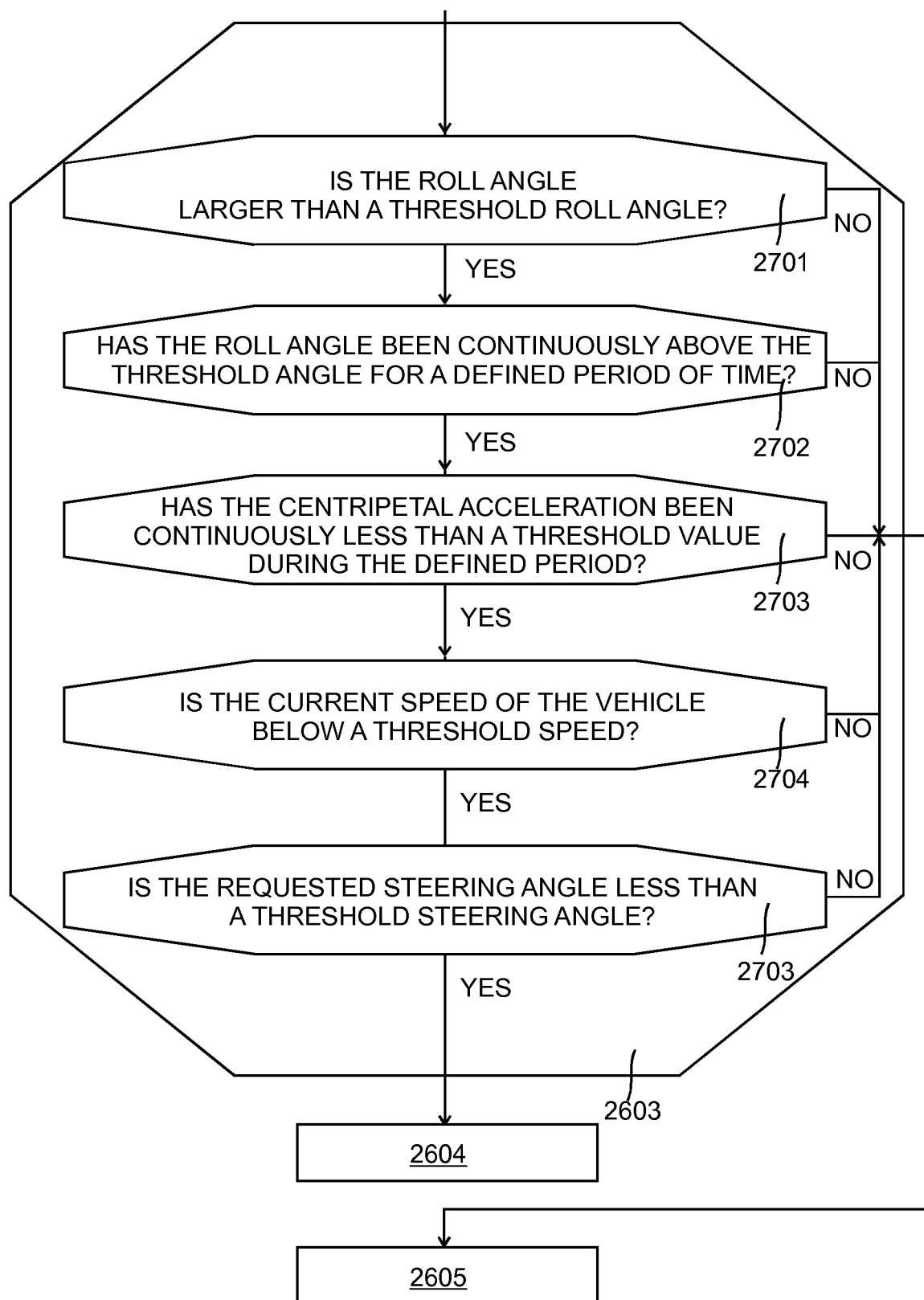
FIG. 27 shows a flowchart illustrating processes performed in the method of FIG. 26.

The processes performed at block 2603 of the method 2600 are illustrated in the flowchart of FIG. 27. At block 2701 a first process of block 2603 is performed, in which it is determined whether the second signal is indicative of a roll angle that is larger than a threshold roll angle. If it is, at block 2702 it is determined whether the roll angle has been continuously above the threshold angle for a predefined period of time. If it has, it is determined at block 2703 whether the centripetal force on the vehicle 100 has been continuously less than a threshold value during the predefined period. If it has, it is determined if the speed (or longitudinal velocity) of the vehicle 100 is less than a threshold speed at block 2704. If it is, it is determined at block 2705 whether the requested steering angle is less than a threshold steering angle. If it is, then all criteria have been met at block 2603, i.e. the vehicle 100 is determined to be in the BANK condition, and consequently the process at block 2604 is performed.

If a negative result is determined at any one of blocks 2701 to 2705, indicating that at least one criterion of the set of criteria has not been met, then the process at block 2605 is performed.

Figure 28:
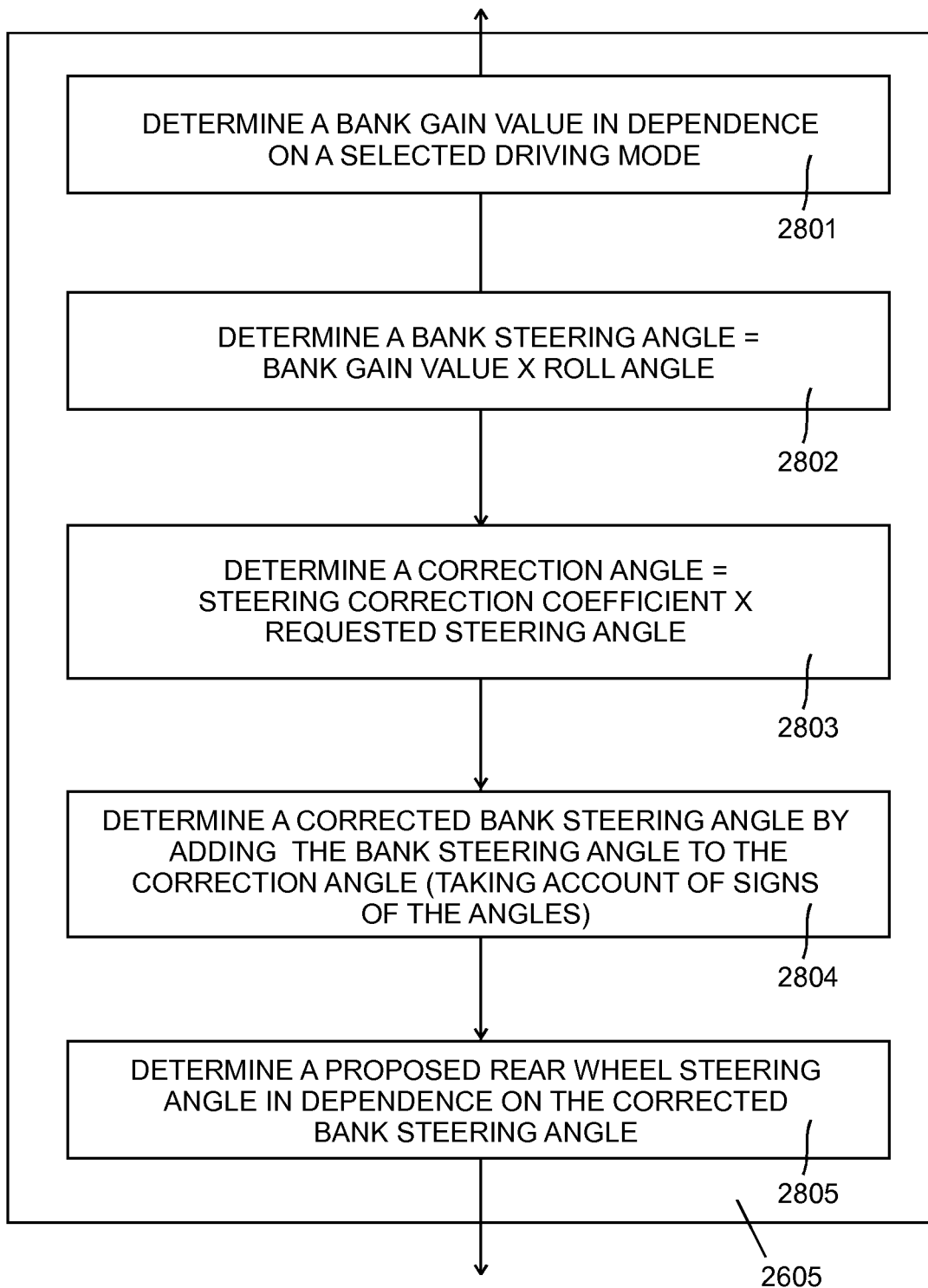
FIG. 28 shows a flowchart illustrating other processes performed in the method of FIG. 26.

The processes performed at block 2605 of the method 2600 are illustrated in the flowchart of FIG. 28, for a vehicle 100 in which the rear wheels 103 are automatically steered in dependence on the roll angle of the vehicle 100. At block 2801 a first process of block 2605 is performed, in which a bank gain value is determined in dependence on the currently selected driving mode of the vehicle 100. At block 2802 a bank steering angle 2401 is determined by multiplying the bank gain value by the roll angle of the vehicle 100. At block 2603 the requested steering angle, which was indicated by the received first signal, is multiplied by a steering correction coefficient to determine a correction angle. At block 2804, the bank steering angle, which was determined at block 2602, is then added to the correction angle, taking account of signs of the angles, to produce a corrected bank steering angle. Finally at block 2805, a proposed rear wheel steering angle is determined at block 2805 in dependence on the corrected bank steering angle.

Figure 29:
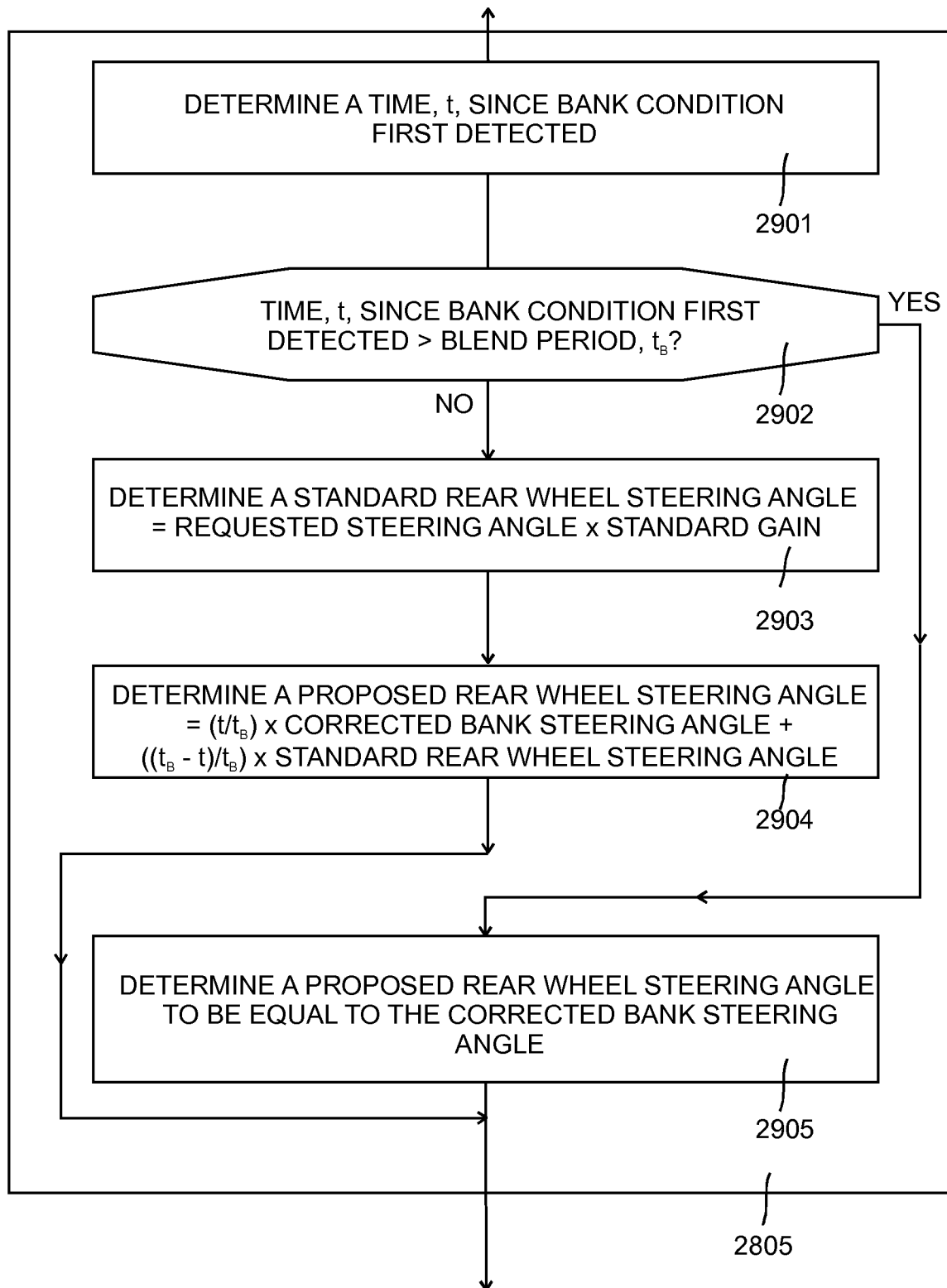
FIG. 29 shows a flowchart illustrating operations performed within a process illustrated in FIG. 28.

The processes performed at block 2805 are illustrated in the flowchart shown in FIG. 29. Initially within block 2805, at block 2901, it is determined how much time, t, has elapsed since a BANK condition was first detected i.e. since all the criteria were first met at block 2603. At block 2902 it is determined whether the elapsed time, t, since the BANK condition was first determined is greater than a predefined blend period, $t_B$. If it is, then at block 2905 the proposed rear wheel steering angle is determined to be equal to the corrected bank steering angle that was produced at block 2804. Otherwise, at block 2903 a standard rear wheel steering angle is determined by multiplying the requested steering angle by a standard gain value. I.e. the standard rear wheel steering angle is determined in just the same way as the proposed rear wheel steering angle when the vehicle is in its STANDARD condition.

Having determined the standard rear wheel steering angle at block 2903, a proposed rear wheel steering angle is determined by a blend function at block 2904. The proposed rear wheel steering angle is calculated by multiplying the corrected bank steering angle by the fraction $(t/t_B)$ of the blend period, $t_B$, that has elapsed and adding the result to the product produced by multiplying the standard rear wheel steering angle by the fraction $((t_B-t)/t_B)$ of the blend period, $t_B$, that remains.

After determining the proposed rear wheel steering angle at either block 2904 or 2905, the process at block 2606 is performed to complete the method 2600.

For purposes of this disclosure, it is to be understood that the control means/controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM or EEPROM); flash memory; or electrical or other types of medium for storing such information/instructions.

The first steering actuator 102 is operable to provide a torque sufficient to turn the wheels 103 of the vehicle 100 at the lower and higher speeds as described above in relation to FIG. 3 and FIG. 4. When stationary this torque may not be sufficient to overcome the friction between the wheels 103 and a driven surface however.

An alternate solution presented by the present invention is to return the wheels 103 to a straight ahead condition in dependence on a determined time value at which the vehicle speed will reach zero.

Figure 30A:
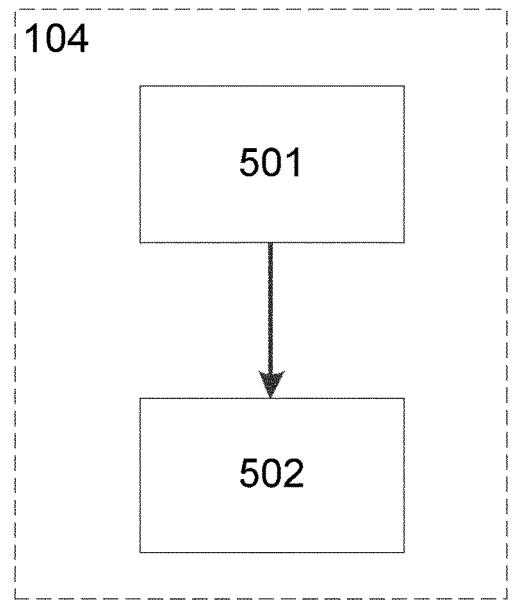
FIG. 30a shows a block diagram illustrating a control system enabling steering of the vehicles of FIGS. 1 and 2.

In such scenarios the control system 104 may be configured to implement a 'return to zero' function. This function comprises two main steps as shown in FIG. 30a. The first step is performed at determination block 501, in which the control system determines a requirement for the steered wheel 'return to zero', and comprises comparing an estimated time until the vehicle speed will reach 0, i.e. a deceleration time value $T_d$, to a target time value $T_T$. The deceleration time value $T_d$ is indicative of a predicted duration until the vehicle's speed reaches zero, i.e. a measure of time from a current point in time to a point in time at which the vehicle is predicted to have zero speed. The second step is performed at control block 502, in which if it is determined at determination block 501 that there is a 'return to zero' requirement then the control system outputs a control signal to control the steered wheels 103 to turn towards the straight ahead condition. In some example these blocks are part of a single controller 105 of the control system 104, in other examples they are part of separates controllers 105 within the control system 104.

The comparison of the deceleration time value $T_d$ to a target time value $T_T$ in order to determine whether the wheels should be controlled to a straight ahead condition comprises monitoring for the condition at which the deceleration time value $T_d$ is less than or equal to the target time value $T_T$:

$$T_d \leq T_T$$

Monitoring for the condition at which the target time value $T_T$ is greater than or equal to the deceleration time value $T_d$ would also be appropriate.

$$T_T \geq T_d$$

Figure 30B:
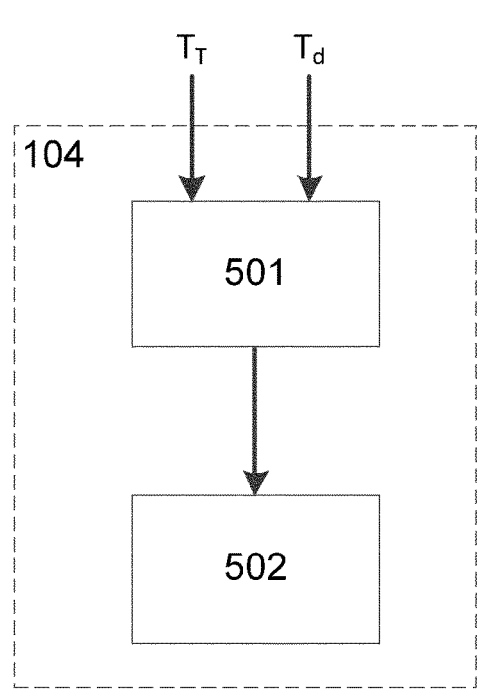
FIG. 30b shows a block diagram illustrating a control system enabling steering of the vehicles of FIGS. 1 and 2.
Figure 30C:
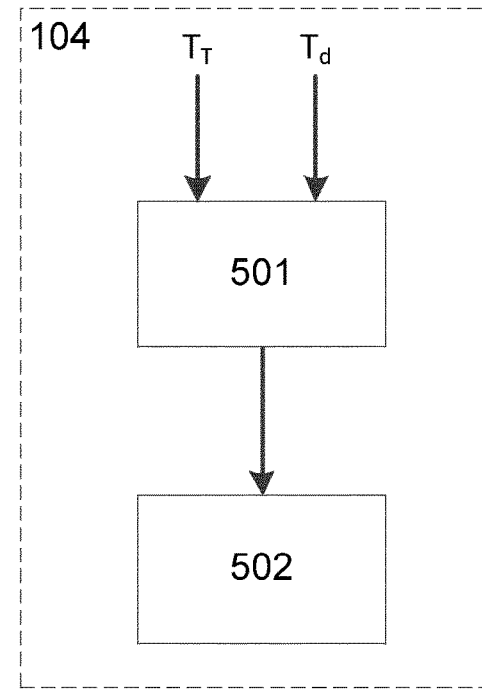
FIG. 30c shows a block diagram illustrating a control system enabling steering of the vehicles of FIGS. 1 and 2.

Both of the time values $T_d$, $T_T$ may be provided as part of signals received at an electrical input (not shown) of the controller 105. These signals may be provided to the control system 104 by another vehicle system as per FIG. 30b or determined by another controller 105 of the control system 104 as per FIG. 30c.

For example the deceleration time value $T_d$ may be received by the control system 104 as part of a signal from another controller or system of the vehicle. A vehicle having an autonomy level of 2 or higher (as defined by SAE) may have a vehicle level controller and/or trajectory planner operable to determine and/or plan a point in time at which the vehicle will be stationary and this, or a derivative of it, could be provided as a value for the deceleration time value $T_d$.

One or both of the time values $T_d$, $T_T$ may be determined within the control system 104.

Figure 31A:
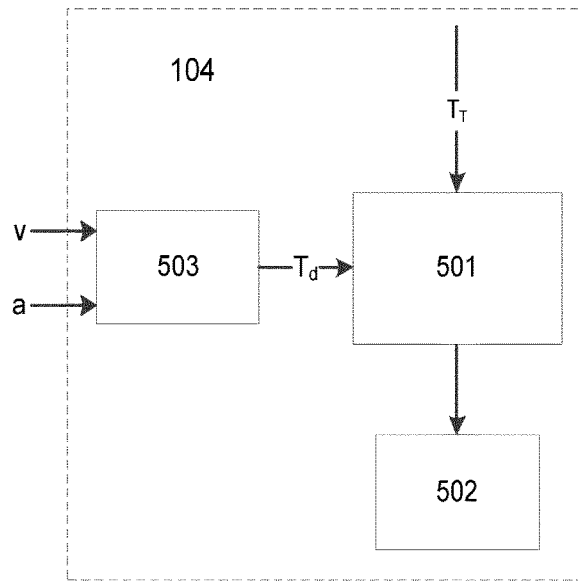
FIG. 31a shows a block diagram illustrating a control system enabling steering of the vehicles of FIGS. 1 and 2.

FIG. 31a provides an example of the control system 104 in which the deceleration time value $T_d$ is determined in dependence on a current vehicle speed v and a current vehicle acceleration a at determination block 503.

A positive velocity coupled with zero or positive acceleration will be indicative that the vehicle is travelling forwards and not decelerating and thus there will be no 'return to zero' requirement. Likewise a negative velocity coupled with zero or negative acceleration will be indicative that the vehicle is travelling in reverse and not decelerating. In both of these cases the standard control as described in relation to FIGS. 4 and 5 will be maintained.

If the velocity is positive and the acceleration is negative, or the velocity is negative and the acceleration is positive, then it is indicative that the vehicle is decelerating and a deceleration time value $T_d$ may be determined:

$$T_d = \frac{v}{a}$$

Figure 31B:
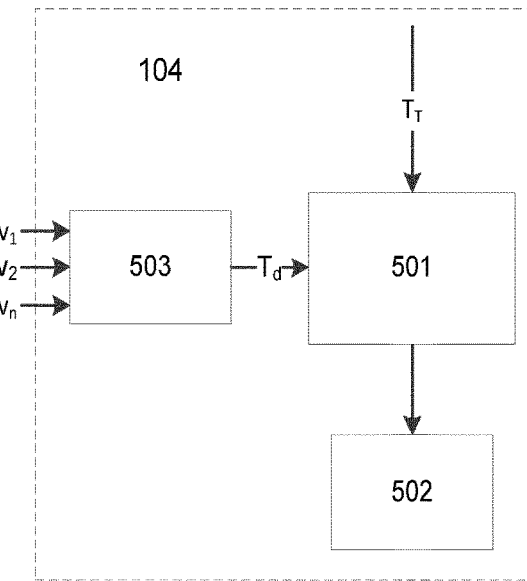
FIG. 31b shows a block diagram illustrating a control system enabling steering of the vehicles of FIGS. 1 and 2.

The deceleration time value $T_d$ may instead be determined at 503 by receiving a plurality of vehicle velocity values $v_1$, $v_2$ ... $v_n$ at corresponding time intervals as per FIG. 31b. These values can then be extrapolated such that an estimated time at which the vehicle velocity is equal to 0 can be provided. The deceleration time value $T_d$ can therefore be calculated as the difference between the current time and the estimated time at which the vehicle velocity is equal to 0

The target time value $T_t$ may be a predetermined value stored within a memory 302 of the at least one controller 105.

Alternatively the target time value $T_T$ may comprise an actuator time value $T_a$ such that in some examples:

$$T_T = T_a$$

Figure 31C:
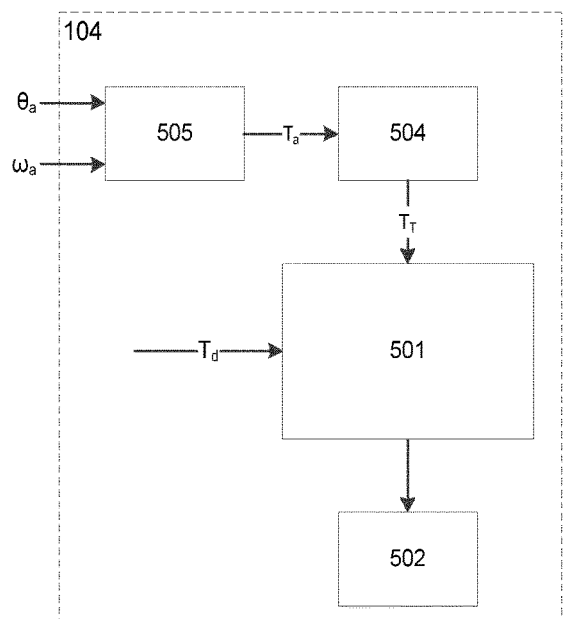
FIG. 31c shows a block diagram illustrating a control system enabling steering of the vehicles of FIGS. 1 and 2.

In some examples the actuator time value $T_a$ may be dynamically determined, as shown at determination block 505 in FIG. 31c. This determination may be done through comparing a current actuator displacement $\theta_a$ (proportional to a current steered angle) to an actuator rate $\omega_a$, i.e. the speed at which the actuator can rotate the wheels in radians per second or degrees per second. The equation for said determination is:

$$T_a = \frac{\theta_a}{\omega_a}$$

For example if the current angular displacement of the wheels is 5° and the rate of actuator rate is 10 degrees per second then the actuator time value $T_a$ will be half a second.

The actuator rate $\omega_a$ may be a predetermined value stored within a memory 302 of the at least one controller 105 or it may be dynamically determined. Either determination may be done in dependence on various vehicle and environmental variables. These variables may include a vehicle mass value, the tyre characteristics of the vehicle, a surface friction value, and a drive mode of the vehicle. The vehicle mass value may be a pre-determined value stored within the memory device 102, alternatively it may be received from a vehicle mass estimator within the control system 104 or another system of the vehicle 100. The surface friction value is indicative of a coefficient of friction between the tyre and the driven surface, it may be determined by and received from the TES 306, or received directly from the terrain sensing means 312 and determined within the control system.

In some examples the control system 104 is configured to retrieve an actuator rate $\omega_a$ from a look-up table stored within the memory device 302 in dependence on signals received indicative of the various vehicle and environmental variables.

The actuator rates $\omega_a$ may fall within the range of 0 rad/s to 0.5 rad/s. Lower values would be in situations with very high vehicle loading a high surface friction such that the actuator may not be able to provide enough torque to turn the wheels 103. Higher values would be in situations in which there is little to no friction or vehicle loading. Maximum rates would be available with the vehicle wheels out of contact with the surface. Average angular rates $\omega_a$ may fall within the range of 0.15 rad/s to 0.25 rad/s with 0.2 rad/s being the rate expected under normal vehicle usage.

It will be appreciated that these angular displacements and rates $\theta_a$, $\omega_a$ could be replaced by linear values, for example in relation to the position of a vehicle steering rack, without departing from the scope of the invention.

Figure 31D:
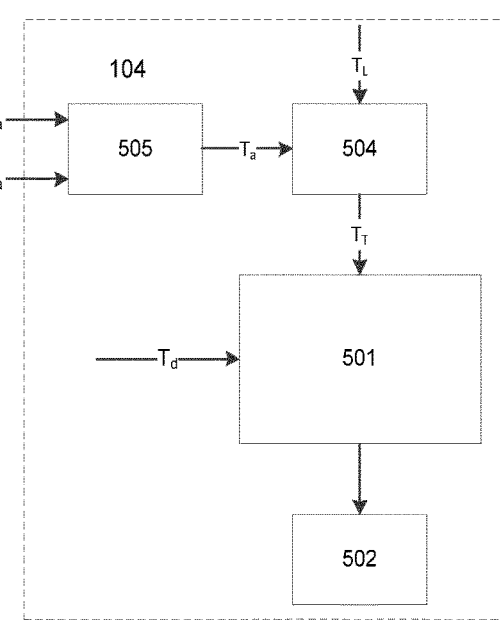
FIG. 31d shows a block diagram illustrating a control system enabling steering of the vehicles of FIGS. 1 and 2.

The target time value $T_T$ may comprise further time values as per FIG. 31d, in which the target time value $T_T$ is determined at determination block 504 in dependence on the further time values. For example the target time value $T_T$ may comprise a latency or tuneable time value $T_L$, such that:

$$T_T = T_a + T_L$$

The tuneable time value $T_L$ may be a predetermined value stored within a memory 302 of the at least one controller 105. The value may fall within the range of 0 to 2 seconds with a preferred value of 1 second. The tuneable time value allows for mitigations against possible, estimated latencies in the vehicle systems, as well as providing a larger window within which the actuator 102 can return the wheels 103 to the straight ahead condition.

The tuneable time value $T_L$ may be modified or determined in dependence on various factors. These factors may include the current vehicle speed, the current vehicle acceleration, the vehicle mass value, the surface friction value, and the drive mode of the vehicle.

Upon the determination that 'return to zero' is required the control system then provides control of the wheels 103 to return to a straight ahead condition. The straight ahead condition may be defined as the wheels 103 being in parallel with a longitudinal axis 1001 of the vehicle 100+/− a predefined tolerance.

The tolerance may be defined in dependence on the characteristics of components of the vehicle associated with the steering and suspension systems. The straight ahead condition may be defined as 0°+/−3.5°.

The controller 105 provides a control signal to the steering actuator 102. This control signal may override the control that is provided in normal driving, i.e. by a normal use control signal. Alternatively it may be output in its place is determined within the same controller 105.

Once the vehicle 100 is determined to be in motion again the control system 104 may resume its normal function as defined above in reference to FIGS. 4 and 5. The determination that the vehicle is in motion may comprise receiving an indication that the vehicle speed is greater than 0.2 m/s.

The 'return to zero' function may be modified or disabled in dependence on the currently selected or determined drive mode. For example when driving in a rock crawl scenario, and therefore when most likely operating in the rock crawl mode, the movement of the vehicle is characterised as being at very low speed. The terrain is also likely to have a very high level of surface friction and the wheels 103 may have varying loads. These conditions are most likely to exceed the capabilities of the actuator 102 and the variations at low speed may cause the wheels 103 to dither as the vehicle is continuously determined to be decelerating to 0 and then accelerating again.

The 'return to zero' function may also be disabled in dependence on other determined driving scenarios. For example in high speed track driving vehicle decelerations may be very high, and thus the deceleration time value $T_d$ may be found to be less than the target time value $T_T$, but the vehicle will not actually be braking to stationary. In order to prevent activation of the 'return to zero' function vehicle speed and acceleration thresholds may be put in place, such that the function does not activate at high vehicle speeds or high decelerations.

It will be appreciated that various changes and modifications can be made to the present invention without departing from the scope of the present application.

The blocks illustrated in the FIGS. 8, 9, 12 to 14, 19 to 21 and 26 to 29 may represent steps in a method and/or sections of code in the computer program 303. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, in alternative embodiments, the control means 105 may be configured to control steering of rear wheels 103 of the vehicle 100 in the STANDARD condition, as described with reference to FIGS. 6 to 9, but not in any, or only in selected ones, of the special conditions. It will also be understood that the control means 105 may be configured to detect other special conditions, in addition to those described, and to control rear wheel steering in a manner that is customized for those other special conditions.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for controlling steering of rear wheels of a vehicle, the apparatus comprising at least one control device comprising:
    one or more electrical inputs for receiving an indication of a rearwards movement condition of a vehicle and a pitch angle of the vehicle; and
    an output for outputting an output signal,
    the at least one control device configured to:
        determine a proposed rear wheel steering angle in dependence on a requested steering angle, the pitch angle of the vehicle and the rearwards movement condition of the vehicle; and
        output an output signal configured to control rear wheel steering in dependence on the proposed rear wheel steering angle.

2. The apparatus according to claim 1, wherein the at least one control device is configured to: determine a proposed rear wheel steering angle that is out of phase with a front wheel steering angle, in dependence on the pitch angle being less than a first threshold pitch angle; and determine a proposed rear wheel steering angle that is not out of phase with the front wheel steering angle, in dependence on the pitch angle being greater than the first threshold pitch angle.

3. The apparatus according to claim 2, wherein the at least one control device is configured to: receive a signal indicative of a selected mode selected from at least a first mode and a second mode; and when the pitch angle is greater than the first threshold pitch angle, determine a proposed rear wheel steering angle that is out of phase with the front wheel steering angle in dependence on the first mode being selected, and determine a proposed rear wheel steering angle that is not out of phase with the front wheel steering angle in dependence on the second mode being selected.

4. The apparatus according to claim 3, wherein the at least one control device is configured to determine a proposed rear wheel steering angle of zero degrees in dependence on the second mode being selected.

5. The apparatus according to claim 3, wherein the at least one control device is configured to receive the signal indicative of a selected mode from a terrain estimation system configured to produce the signal in dependence on detected characteristics of the ground on which the vehicle is travelling.

6. The apparatus according to claim 3, wherein the first mode is selectable in dependence on a determination that friction between the wheels of the vehicle and the ground in contact with the wheels is above a first friction threshold and the second mode is selectable in dependence on a determination that said friction is below the first friction threshold.

7. The apparatus according to claim 3, wherein the second mode is selectable in dependence on a determination that the ground in contact with the wheels is deformable by the wheels of the vehicle.

8. The apparatus according to claim 3, wherein the apparatus is configured to receive the signal indicative of a selected mode from a user input device.

9. The apparatus according to claim 3, wherein at least one performance characteristic of the vehicle is determined in dependence on the selected mode, the at least one performance characteristic comprising at least one of the group consisting of: accelerator pedal map; transmission map; stability control settings.

10. The apparatus according to claim 1, wherein the proposed rear wheel steering angle is the product of the front wheel steering angle and a gain value, and the at least one control device is configured to: determine a first proposed rear wheel steering angle with a first gain value in dependence on the pitch angle being below the first threshold pitch angle; and determine a second proposed rear wheel steering angle with a second gain value, of smaller magnitude than the first gain value, in dependence on the pitch angle being greater than a second threshold pitch angle.

11. The apparatus according to claim 10, wherein the at least one control device is configured to determine the proposed rear wheel steering angle to be zero in dependence on determining that the pitch angle is greater than the second threshold pitch angle.

12. The apparatus according to claim 1, wherein, in dependence on determining a rearwards movement condition and a pitch angle greater than a threshold pitch angle, determine a proposed rear wheel steering angle that is proportional to the steering input, and determine a proposed front wheel steering angle that is proportional to the steering input and smaller than the rear wheel steering angle.

13. The apparatus according to claim 1, wherein the at least one control device is configured to determine the rearwards movement condition in dependence on receiving a signal indicative of rearwards movement of the vehicle and/or receiving a signal indicative of a reverse gear of the vehicle being selected.

14. The apparatus of according to claim 1 comprised within a vehicle.

15. A method for controlling steering of rear wheels of a vehicle, the method comprising:
- determining a rearwards movement condition of a vehicle;
- determining a pitch angle of the vehicle;
- determining a proposed rear wheel steering angle in dependence on a requested steering angle, the pitch angle of the vehicle and the rearwards movement condition of the vehicle; and
- outputting an output signal configured to control rear wheel steering in dependence on the proposed rear wheel steering angle.

16. A non-transitory, computer-readable storage medium storing instructions thereon that, when executed by one or more electronic processors, causes the one or more electronic processors to carry out the method of claim 15.

* * * * *